(12) United States Patent
Watano

(10) Patent No.: US 8,946,634 B2
(45) Date of Patent: Feb. 3, 2015

(54) RADIOGRAPHIC IMAGE CAPTURE DEVICE

(71) Applicant: FUJIFILM Corporation, Tokyo (JP)

(72) Inventor: Hirotaka Watano, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/934,469

(22) Filed: Jul. 3, 2013

(65) Prior Publication Data

US 2014/0027637 A1    Jan. 30, 2014

(30) Foreign Application Priority Data

Jul. 27, 2012    (JP) ................................. 2012-167420

(51) Int. Cl.
| | |
|---|---|
| *G01J 1/00* | (2006.01) |
| *G01T 1/20* | (2006.01) |
| *G01T 1/24* | (2006.01) |
| *G01T 1/16* | (2006.01) |

(52) U.S. Cl.
CPC ................. *G01T 1/16* (2013.01); *G01T 1/2018* (2013.01)
USPC ..................... 250/336.1; 250/366; 250/370.15

(58) Field of Classification Search
CPC .. H01L 23/16; H01L 23/3128; H01L 21/6835
USPC .......................................... 250/336.1, 370.15
See application file for complete search history.

(56) References Cited

U.S. PATENT DOCUMENTS

| | | | |
|---|---|---|---|
| 2008/0024714 A1* | 1/2008 | Park .............................. | 349/150 |
| 2010/0078786 A1* | 4/2010 | Maeda .......................... | 257/678 |
| 2010/0224785 A1* | 9/2010 | Chiyoma et al. .............. | 250/369 |
| 2012/0097857 A1* | 4/2012 | Hayatsu et al. ............... | 250/366 |

FOREIGN PATENT DOCUMENTS

JP        2011-128000 A      6/2011

\* cited by examiner

*Primary Examiner* — David Porta
*Assistant Examiner* — Kenneth J Malkowski
(74) *Attorney, Agent, or Firm* — Birch, Stewart, Kolasch & Birch, LLP

(57) ABSTRACT

A radiographic image capture device of the present invention includes: a radiation detection panel including a photoelectric conversion element that converts radiation into an electrical signal; a signal processing board that is disposed facing towards the radiation detection panel and that performs signal processing on electrical signals obtained by the radiation detection panel; a flexible substrate that includes wiring lines disposed on a base film provided between the radiation detection panel and the signal processing board and including a low wiring density region and a high wiring density region, and electronic component(s) that are electrically connected to the wiring lines; a reinforcement member that is provided at a low wiring density region and that raises the mechanical strength of the wiring lines.

12 Claims, 25 Drawing Sheets

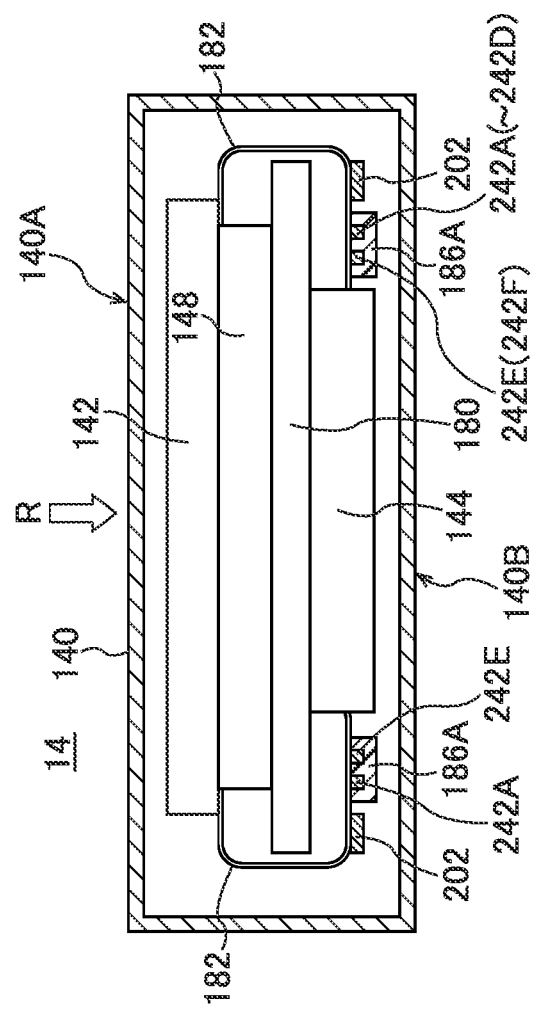

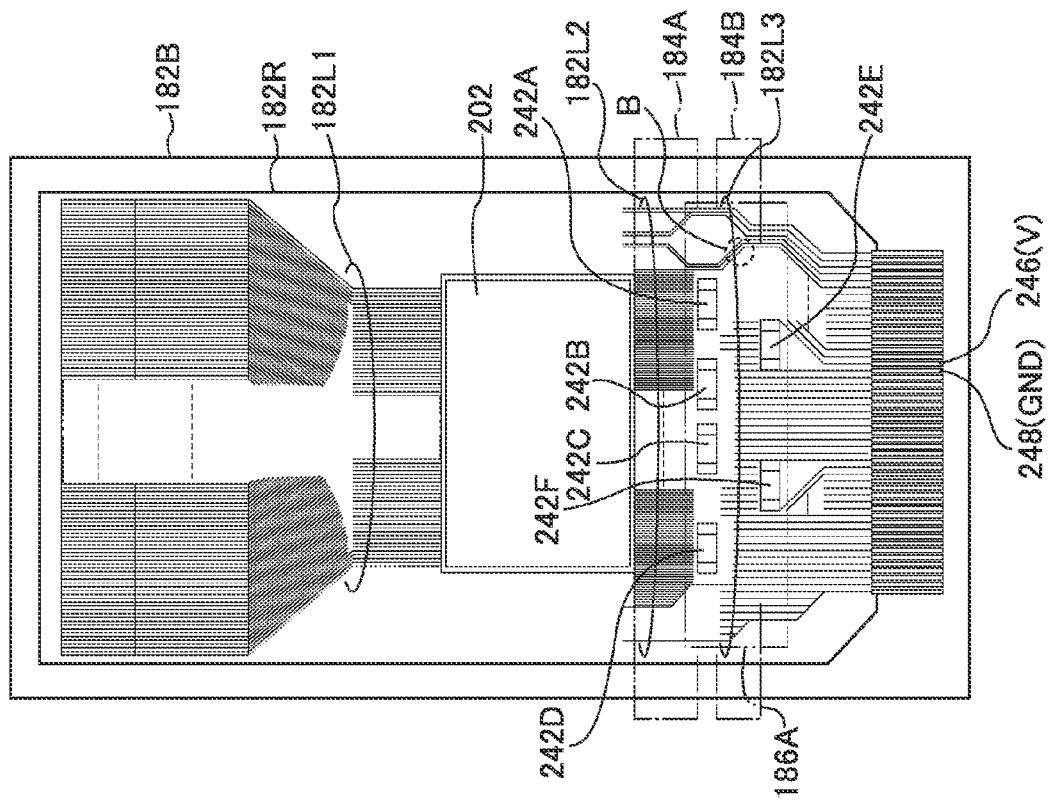

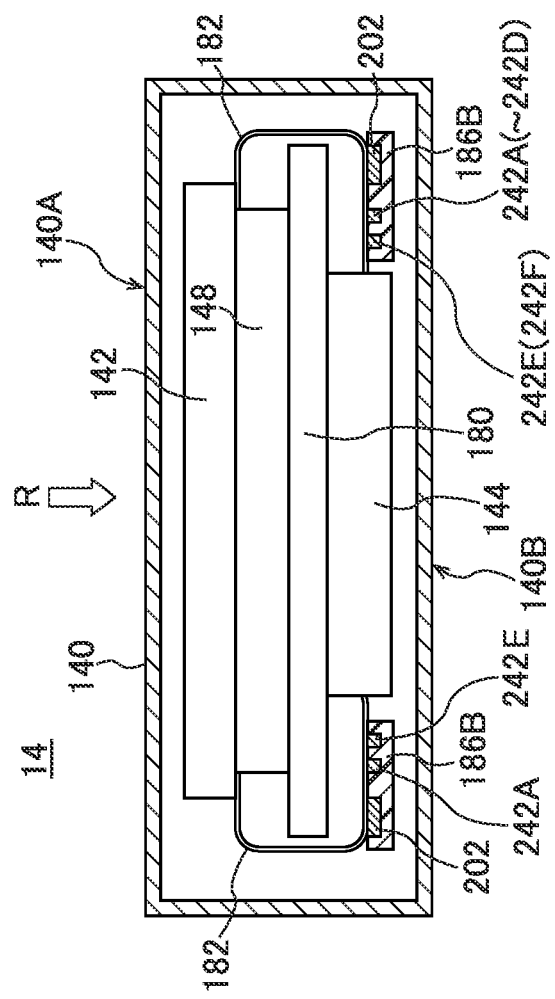

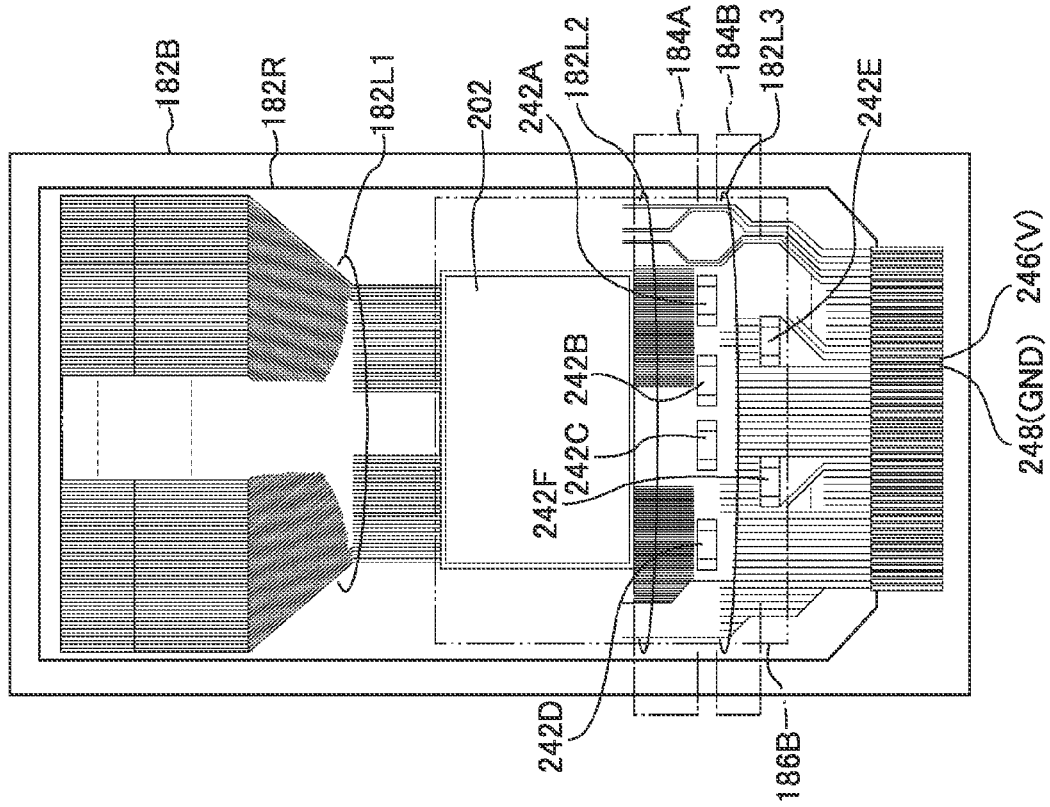

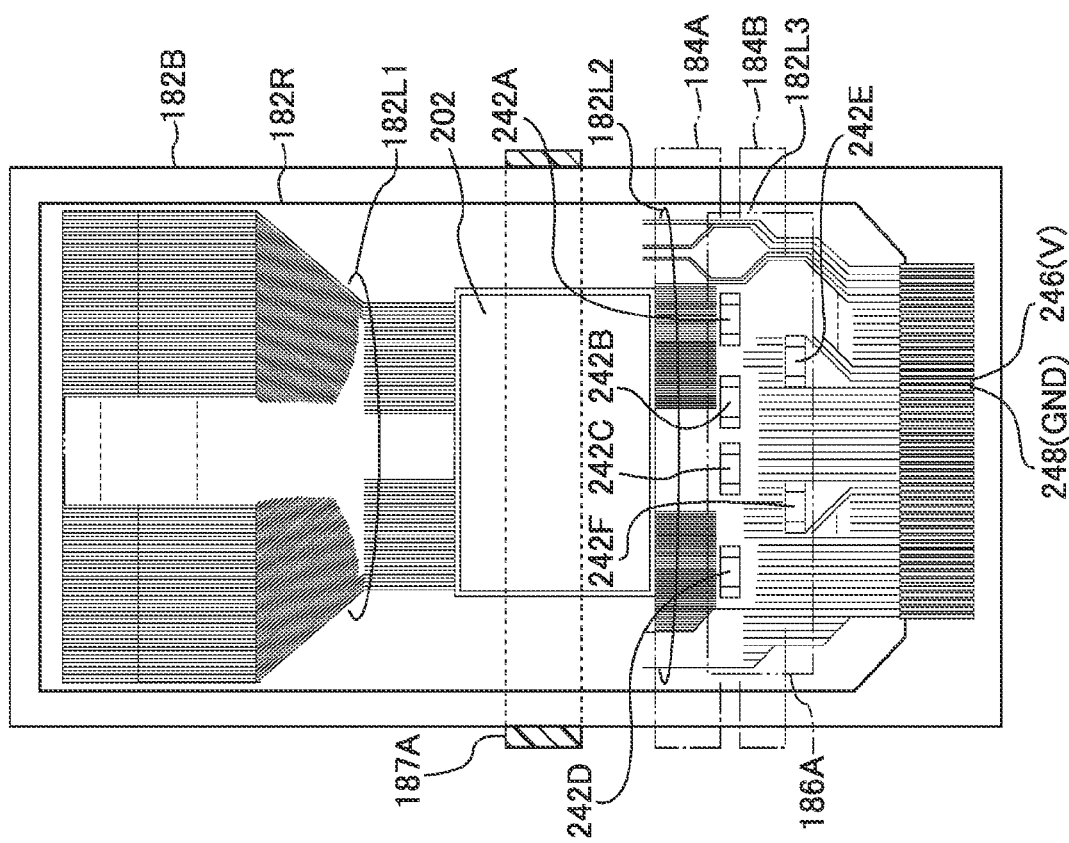

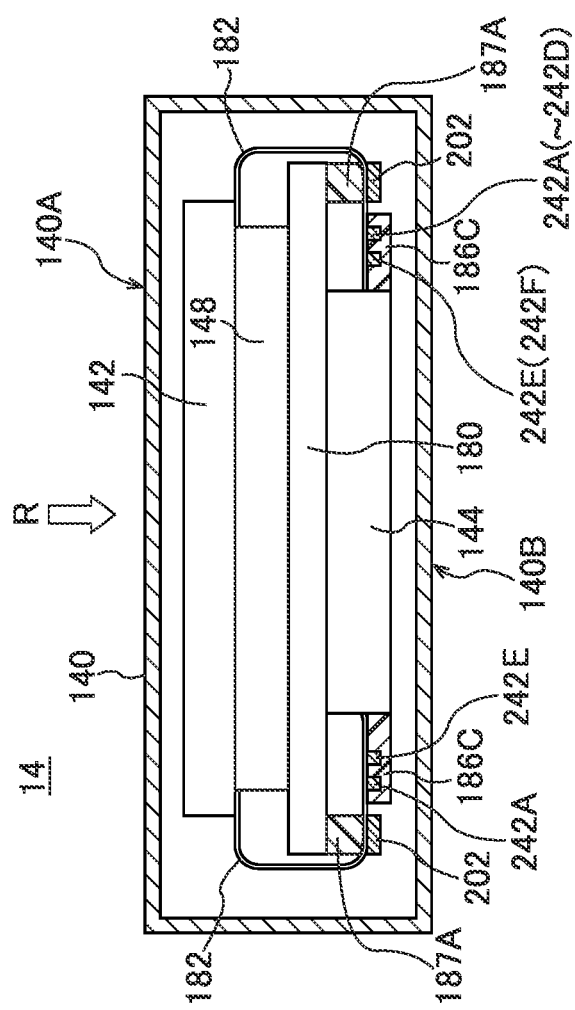

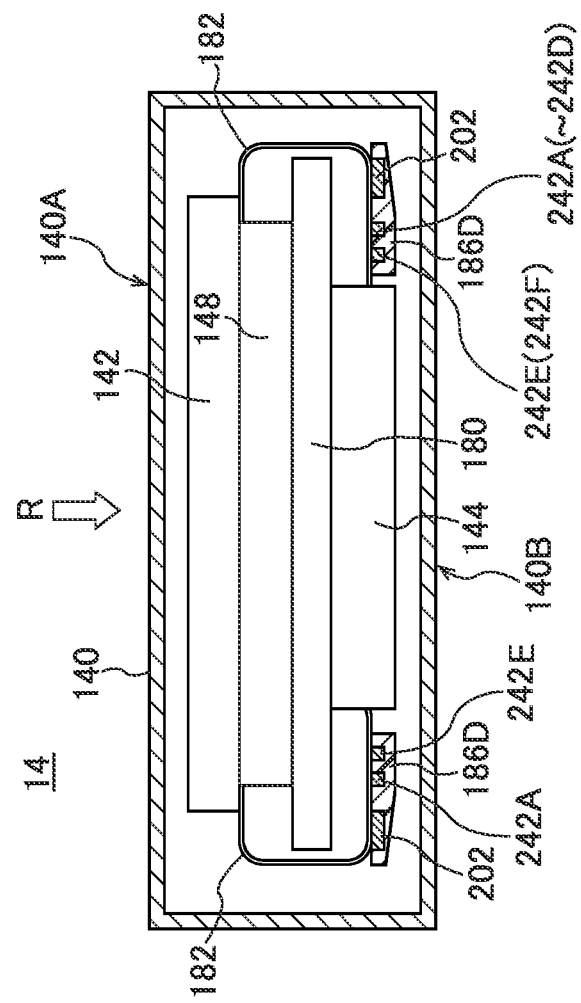

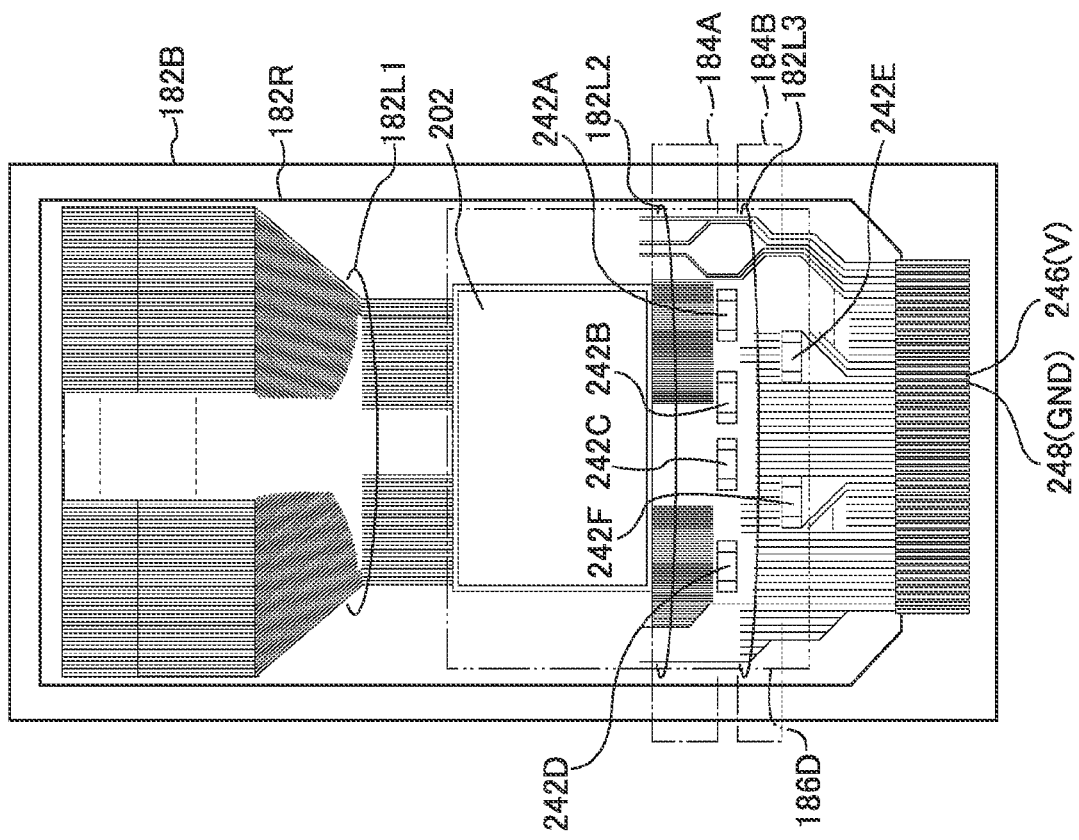

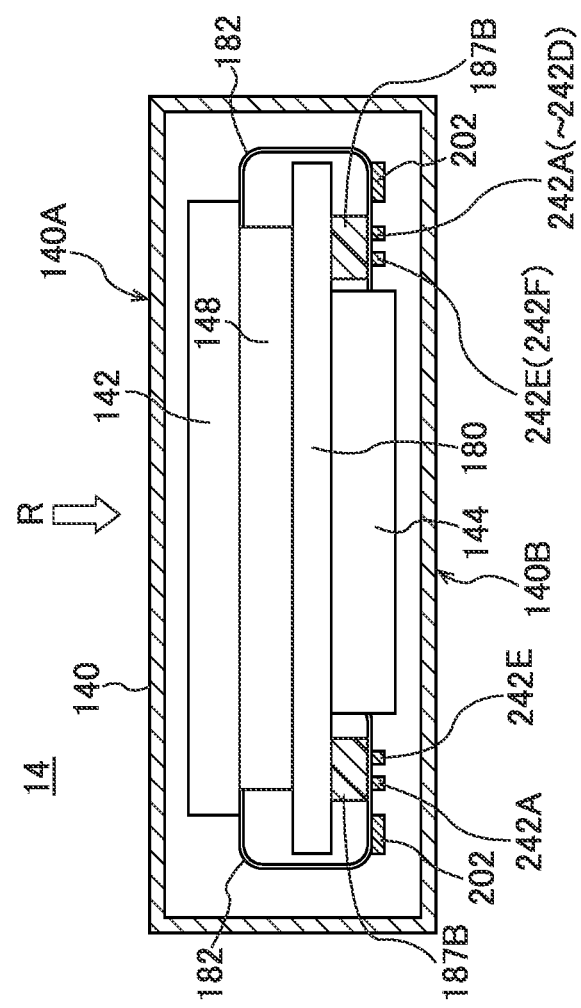

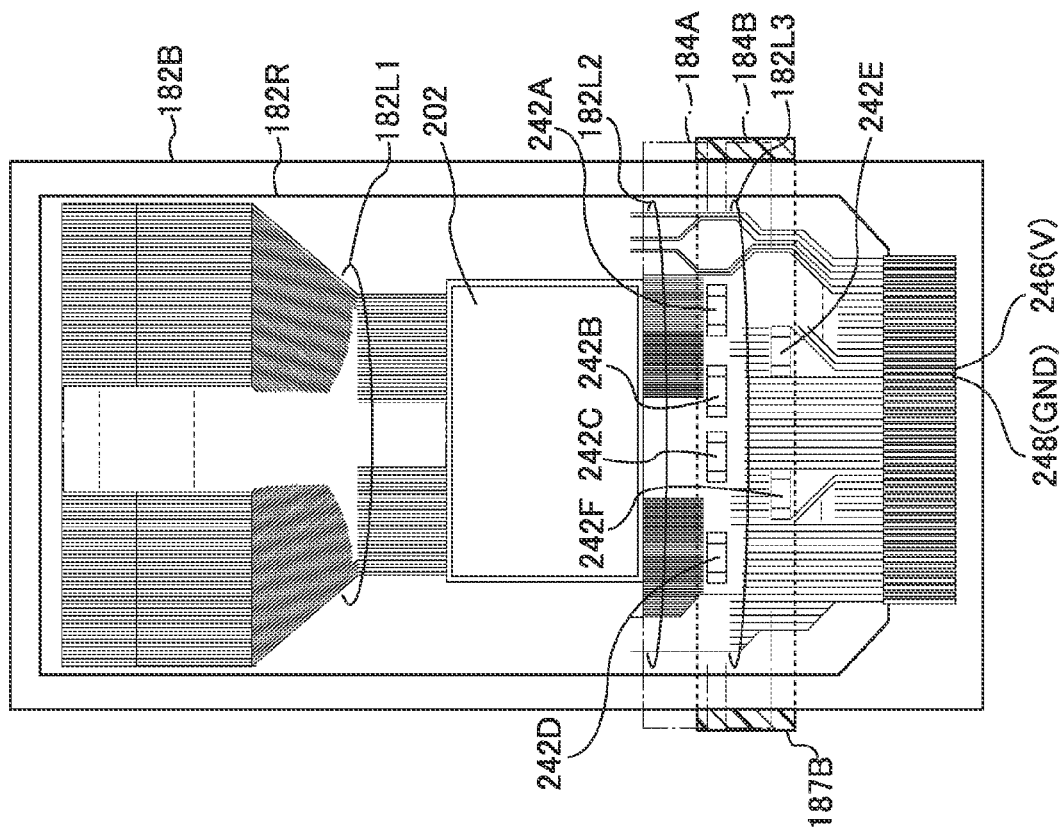

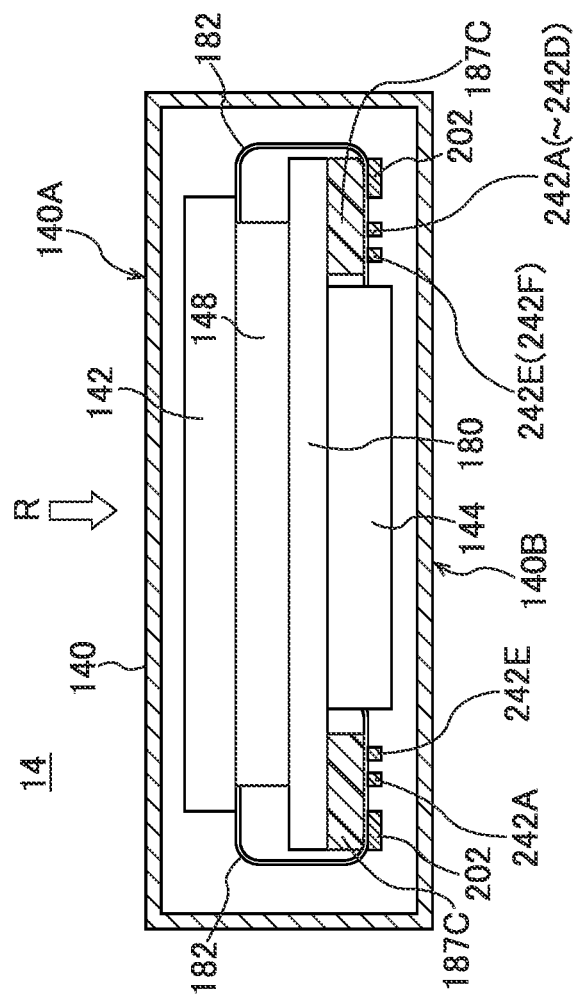

RADIOGRAPHIC IMAGE CAPTURE DEVICE

CROSS-REFERENCE TO RELATED APPLICATION

This application claims priority under 35 USC 119 from Japanese Patent Application No. 2012-167420 filed on Jul. 27, 2012, the disclosure of which is incorporated by reference herein.

BACKGROUND

1. Technical Field

The present invention relates to a radiographic image capture device, and in particular to a radiographic image capture device in which a radiation detection panel and a signal processing board are connected together by a flexible substrate.

2. Related Art

Radiation detectors are being implemented such as Flat Panel Detectors (FPDs) that convert radiation directly into digital data using a radiation sensitive layer disposed on a Thin Film Transistor (TFT) active matrix substrate. In radiographic image capture devices employing such radiation detectors, images can be more immediately checked than with radiographic image capture devices employing conventional X-ray film and imaging plates. Moreover, with such radiographic image capture devices there is the capability for fluorography (video imaging) in which successive capture of radiographic images is performed.

There are various types of such radiation detectors proposed. For example, in a radiation detector employing an indirect conversion method, radiation is converted into light by a scintillator, then the converted light is further converted into charges by sensor portions such as photodiodes. These charges are captured imaging data obtained by X-rays. In such a radiographic image capture device, the charges that have been converted by the radiation detector are read as analogue signals, and then these analogue signals are converted into digital data by an analogue-to-digital (A/D) converter after being amplified by amplifiers.

An X-ray image detector is described in Japanese Patent Application Laid-Open (JP-A) No. 2011-128000 that includes an X-ray detection panel and a circuit board, provided at the face of the X-ray detection panel on the opposite side to the X-ray incident face, that are connected together by a flexible substrate. A flexible substrate bends around from an end portion of the X-ray detection panel and is connectable to an end portion of the circuit board, resulting in a high degree of freedom for wiring. Chip On Film (COF) types of flexible substrate are being employed in which an integrated circuit, such as a gate driver and integrating amplifier, is mounted to a central portion of the flexible substrate.

When an integrated circuit (electronic component) with an analogue-to-digital conversion processing function is mounted to a flexible substrate, it is beneficial for condensers (electronic components) to be mounted to the flexible substrate in the vicinity of the integrated circuit. The condensers are electrically connected in parallel across a power source that supplies the integrated circuit, and have the function of smoothing condensers that reduce power noise. Plural condensers are mounted. The condensers mounted at positions in the vicinity of the integrated circuit are present in a high wiring density region where many signal lines connected to the integrated circuit are disposed and are connected across the power source. The condensers mounted at positions away from the integrated circuit are laid to avoid the condensers mounted at positions in the vicinity of the integrated circuit and are connected across the power source. The power source is present in a low wiring density region.

Positional adjustment of the radiographic image detector with respect to the investigation subject (patient) and adjustment of the posture of the investigation subject is performed during, or just prior to, X-ray imaging. An external force is imparted to the radiographic image detector if during this process the investigation subject makes contact with or hits the radiographic image detector, and deformation and vibration arise from the external force due to the flexibility of the flexible substrate. The deformation amount and vibration amplitude of the flexible substrate is exacerbated by the weight of the integrated circuit in cases in which the flexible substrate is a COF type.

Hence although the deformation amount and vibration amplitude of the flexible substrate is suppressed by the rigidity of the wiring lines in high wiring density regions of the flexible substrate, the deformation amount and vibration amplitude is increased in the low wiring density regions of the flexible substrate, with this being a cause of damage such as creasing or severing of the wiring lines. In cases in which damage such as creasing or severing of power supply lines occurs, faults occur in operation of the analogue-to-digital converter driven by the power source, and radiographic image data output through the analogue-to-digital converter is lost. Namely, this is a cause of line defects due to loss of radiographic image data of detection lines of the radiation detection panel connected to the analogue-to-digital converter.

SUMMARY

In consideration of the above circumstances, the present invention provides a radiographic image capture device capable of effectively suppressing or preventing damage to wiring lines that accompanies deformation and vibration of a flexible substrate from an external force.

A radiographic image capture device according to the present invention includes: a radiation detection panel including a photoelectric conversion element that converts radiation into an electrical signal; a signal processing board that is disposed facing towards the radiation detection panel and that performs signal processing on electrical signals obtained by the radiation detection panel; a flexible substrate that includes wiring lines disposed on a base film provided between the radiation detection panel and the signal processing board and including a low wiring density region and a high wiring density region, and electronic component(s) that are electrically connected to the wiring lines; and a reinforcement member that is provided at a low wiring density region and that raises the mechanical strength of the wiring lines.

In the radiographic image capture device according to the present invention, deformation and vibration occurs in the flexible substrate when an external force is imparted during handling. For flexible substrates provided with electronic components, the deformation amount and vibration amplitude of the flexible substrate is exacerbated by the weight of the electronic components, increasing stress imparted to the wiring lines. In particular, in a low wiring density region of the flexible substrate, the deformation amount and vibration amplitude of the flexible substrate would generally be larger than in a high wiring density region. The reinforcement member is accordingly provided at least at the low wiring density region of the flexible substrate, such that the mechanical strength of the wiring in the low wiring density region is raised by the reinforcement member. The deformation amount and vibration amplitude is accordingly suppressed in the low wiring density region of the flexible substrate, enabling damage such as creasing or severing of the wiring lines to be effectively suppressed or prevented.

Moreover, in the radiographic image capture device of the present invention, preferably: plural of the electronic components are provided at the flexible substrate; and the reinforcement member is provided in at least the low wiring density region between the electronic components.

In the radiographic image capture device of the present invention, due to the absence of electronic components the mechanical strength of the region of the flexible substrate between electronic components is lower than the mechanical strength of the region of the flexible substrate where the electronic components are provided. The deformation amount and vibration amplitude of the flexible substrate is suppressed by providing the reinforcement member in the low wiring density region that is the region of the flexible substrate between the electronic components, enabling damage such as creasing or severing of the wiring lines to be effectively suppressed or prevented.

Moreover, in the radiographic image capture device according to the present invention, preferably the reinforcement member is provided contiguously from the low wiring density region at least as far as a region where the electronic components are provided.

In the radiographic image capture device according to the present invention, in addition to in the low wiring density region of the flexible substrate, the reinforcement member is also provided contiguously from the low wiring density region at least as far as a region where the electronic components are provided. Due to the presence of the electronic components, the mechanical strength is high in the region of the flexible substrate where the electronic components are provided, and the mechanical strength is further raised by the reinforcement member. The mechanical strength in particular in the low wiring density region is further raised by providing the reinforcement member contiguously to the region where the electronic components are provided and to the low wiring density region.

Moreover, in the radiographic image capture device according to the present invention, preferably the electronic components include a first electronic component, and a second electronic component and a third electronic component that are smaller in size than the first electronic component; the first electronic component, the second electronic component and the third electronic component are arrayed in this sequence along an extension direction of the wiring lines, such that the high wiring density region is between the first electronic component and the second electronic component and the low wiring density region is between the second electronic component and the third electronic component; and the reinforcement member is provided at least between the second electronic component and the third electronic component.

In the image reading apparatus according to the present invention, the high wiring density region is present on the flexible substrate between the first electronic component of large size (heavy) and the second electronic component of small size (light). Moreover, the low wiring density region is present between the second electronic components and the third electronic components, these being of respectively small size. The reinforcement member is provided at least at the low wiring density region between the second electronic components and the third electronic components. Hence the deformation amount and vibration amplitude of the flexible substrate in the low wiring density region is suppressed, thereby enabling damage such as creasing or severing of the wiring lines to be effectively suppressed or prevented.

Moreover, a tensile elasticity of the reinforcement member is set to be 1 Mpa or greater and to be lower than a tensile elasticity of the flexible substrate.

In the radiographic image capture device according to the present invention, the tensile elasticity of the reinforcement member is set to be 1 Mpa or greater and to be lower than the tensile elasticity of the flexible substrate. The mechanical strength of the wiring lines is accordingly raised while still enabling the flexibility of the flexible substrate to be maintained.

Moreover, in the radiographic image capture device according to the present invention preferably a thickness of the reinforcement member is set to be thicker than the thickness of the flexible substrate.

In the radiographic image capture device according to the present invention, the reinforcement member that has a lower elasticity (is softer) than that of the flexible substrate is provided at a thickness that is thicker than the thickness of the flexible substrate. The reinforcement member accordingly raises the mechanical strength of the wiring lines whilst maintaining the flexibility (bendability) of the flexible substrate.

In the radiographic image capture device according to the present invention, preferably a thickness of the reinforcement member thins linearly or non-linearly from the low wiring density region towards the high wiring density region of the flexible substrate.

In the radiographic image capture device according to the present invention, the mechanical strength of the low wiring density region of the flexible substrate is raised, and the mechanical strength of the wiring lines gradually decreases from the low wiring density region towards the high wiring density region of the flexible substrate. Namely, due to being able to uniformly distribute stress imparted to the flexible substrate from external force, generation of uneven stress is suppressed, thereby enabling damage to the wiring lines to be effectively suppressed or prevented. Moreover, the thickness of the reinforcement member gets thinner on progression from the low wiring density region of the flexible substrate towards the high wiring density region, enabling the amount of the reinforcement member used to be reduced.

Moreover, in the radiographic image capture device according to the present invention, preferably the flexible substrate is configured by a stacked layer of the base film formed from a polyimide resin film and the wiring lines formed from copper, and the reinforcement member is configured from at least one material selected from the group consisting of a styrene polymer, an acrylic resin, an epoxy resin, a urethane resin and a silicone resin.

In the radiographic image capture device according to the present invention, the reinforcement member is configured from at least one material such as a styrene polymer. The elasticity of the reinforcement member is accordingly set lower than the elasticity of the flexible substrate, thereby enabling the mechanical strength of the wiring lines to be raised and flexibility of the flexible substrate to be maintained.

In the radiographic image capture device according to the present invention, preferably the first electronic component has a function to perform analogue-to-digital signal processing on the electrical signals from the radiation detection panel to convert analogue signals into digital signals; the second electronic component and the third electronic component both have a function to reduce noise in power supplied to the first electronic component; and power supply lines that connect between the first electronic component and the third electronic component are disposed at the low wiring density region between the second electronic component and the third electronic component.

In the radiographic image capture device according to the present invention, the mechanical strength of the power supply lines provided at the low wiring density region is raised by the reinforcement member. Damage (such as creasing or severing) of the power supply lines is effectively prevented or suppressed by the reinforcement member, and so power supply with noise that has been reduced by the second electronic component and the third electronic component is supplied to the first electronic component. Since analogue-to-digital signal processing is performed by the first electronic components on the electrical signals from the radiation detection panel, this enables defects (in particular occurrence of line defects) in radiographic image capture data to be prevented from occurring.

Moreover, in the radiographic image capture device according to the present invention, preferably: the first electronic component includes plural sample-and-hold circuits that are connected to each output signal line of the radiation detection panel, a multiplexer with an input that is connected to outputs of the plural sample-and-hold circuits, and an analogue-to-digital converter with an input connected to an output of the multiplexer and an output connected to the signal processing board; and the second electronic component and the third electronic component are both condensers electrically connected in parallel across the power supply that supplies the first electronic component.

In the radiographic image capture device according to the present invention, the mechanical strength of the power supply lines provided at the low wiring density region is raised by the reinforcement member. Damage (such as creasing or severing) of the wiring lines is effectively suppressed or prevented by the reinforcement member, and so power supply that has been smoothed by the second electronic component and the third electronic component is supplied to the first electronic component. Since analogue-to-digital signal processing is performed in the first electronic component on the electrical signals from the radiation detection panel, this enables defects (in particular occurrence of line defects) in radiographic image capture data to be prevented from occurring.

Moreover, the radiographic image capture device according to the present invention preferably further includes a housing that internally houses the radiation detection panel, the signal processing board and the flexible substrate, and the reinforcement member makes contact with an inner wall of the housing.

In the radiographic image capture device according to the present invention, the reinforcement member makes contract the inner wall of the housing. Heat is generated accompanying operation of the electronic component provided to the flexible substrate, or operation of the first electronic component to the third electronic component. The reinforcement member makes contact with the inner wall of the housing, thereby enabling heat to be dissipated from the electronic component, through the reinforcement member, to the housing. The heat dissipation capability is accordingly raised.

Moreover, the radiographic image capture device according to the present invention preferably further includes: a support member that is provided between the radiation detection panel and the signal processing board to support the radiation detection panel and the signal processing board; and a fixing member that is disposed between a region of the flexible substrate where the electronic component is provided and the support member, and that fixes the region of the flexible substrate where the electronic component is provided to the support member.

In the radiographic image capture device according to the present invention, deformation and vibration occur in the flexible substrate when an external force is imparted during handling. The deformation amount and vibration amplitude of the flexible substrate is exacerbated by the weight of the electronic component, and so the stress imparted to the wiring lines is also increased. In particular, the deformation amount and vibration amplitude of the flexible substrate would generally be larger in the low wiring density region of the flexible substrate than in the high wiring density region. The fixing member is provided at least between the region of the flexible substrate where the electronic component is provided and the support member, and this region is fixed to the support member by the fixing member. Due to fixing the portion that is the cause of exacerbating the deformation amount and vibration amplitude of the flexible substrate to the support member by the fixing member, a configuration is achieved in which local deformation and vibration does not occur in the flexible substrate. The deformation amount and vibration amplitude in the low wiring density region of the flexible substrate is accordingly suppressed, thereby enabling damage such as creasing or severing of the wiring lines to be effectively suppressed or prevented from occurring.

Moreover, in the radiographic image capture device according to the present invention, preferably the fixing member is configured from at least one material with heat dissipation capability selected from the group consisting of a silicone gel, a urethane gel, and an acrylic gel.

In the radiographic image capture device according to the present invention, the fixing member is configured from at least one material selected from the group consisting of a silicone gel, a urethane gel, and an acrylic gel. Since these materials have appropriate elasticity, deformation and vibration of the flexible substrate can be efficiently suppressed or prevented. In addition, since these materials have heat dissipation capabilities, the heat dissipation capability can also be raised.

BRIEF DESCRIPTION OF THE DRAWINGS

Exemplary embodiments of the present invention will be described in detail based on the following figures, wherein:

FIG. 7A is a side cross-section illustrating a specific structure of a radiographic image detector;

FIG. 7B is a plan view of the flexible substrate illustrated in FIG. 7A;

FIG. 9A is a side cross-section illustrating a specific structure of a radiographic image detector of a radiographic image capture device according to a second exemplary embodiment of the present invention;

FIG. 9B is a plan view of a flexible substrate illustrated in FIG. 9A;

FIG. 10B is a plan view of a flexible substrate illustrated in FIG. 10A;

FIG. 11A is a side cross-section illustrating a specific structure of a radiographic image detector of a radiographic image capture device according to a fourth exemplary embodiment of the present invention;

FIG. 12A is a side cross-section illustrating a specific structure of a radiographic image detector of a radiographic image capture device according to a fifth exemplary embodiment of the present invention;

FIG. 12B is a plan view of a flexible substrate illustrated in FIG. 12A;

FIG. 13A is a side cross-section illustrating a specific structure of a radiographic image detector of a radiographic image capture device according to a sixth exemplary embodiment of the present invention;

FIG. 13B is a plan view of a flexible substrate illustrated in FIG. 13A;

FIG. 15A is a side cross-section illustrating a specific structure of a radiographic image detector of a radiographic image capture device according to an eighth exemplary embodiment of the present invention;

DETAILED DESCRIPTION

Figure 1:
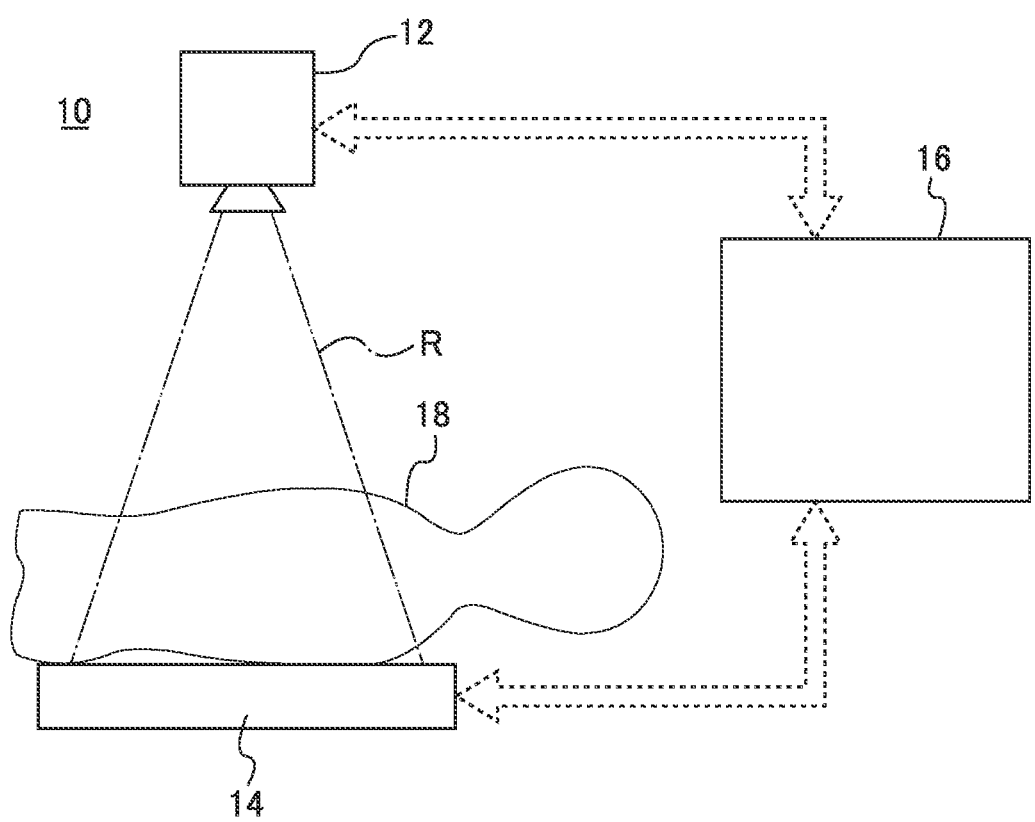
FIG. 1 is a schematic side view to explain an overall configuration of a radiographic image capture device according to a first exemplary embodiment of the present invention.

Explanation follows regarding exemplary embodiments according to the present invention, with reference to the attached drawings. Note that configuration elements having a similar function to each other are appended with the same reference numerals in the drawings, and duplicated explanation is omitted as appropriate.

(First Exemplary Embodiment)

Explanation follows regarding a portable radiographic image detector configuring a radiographic image capture device of a first exemplary embodiment of the present invention, which is an example of the present invention applied to what is referred to as an electronic cassette.

[Overall Configuration of Radiographic Image Capture Device]

As illustrated in FIG. 1, a radiographic image capture device 10 according to a first exemplary embodiment is configured including a radiation irradiation device 12, a radiographic image detector 14 (electronic cassette) and a console 16. The radiation irradiation device 12 generates radiation R, and irradiates the radiation R onto an investigation subject 18 (for example a patient for imaging a radiographic image). The radiographic image detector 14 generates radiographic image data obtained by the radiation R that has passed through the investigation subject 18. The radiographic image detector 14 is a portable type that is capable of being carried around. The console 16 controls the operation of the radiation irradiation device 12 and the radiographic image detector 14, and has such functions as storing the radiographic image data generated in the radiographic image detector 14 and displaying the radiographic image data.

Note that in the first exemplary embodiment, the radiographic image detector 14 may, or may not, be equipped with a function to store the radiographic image data.

[External Configuration of Radiographic Image Detector]

Figure 2:
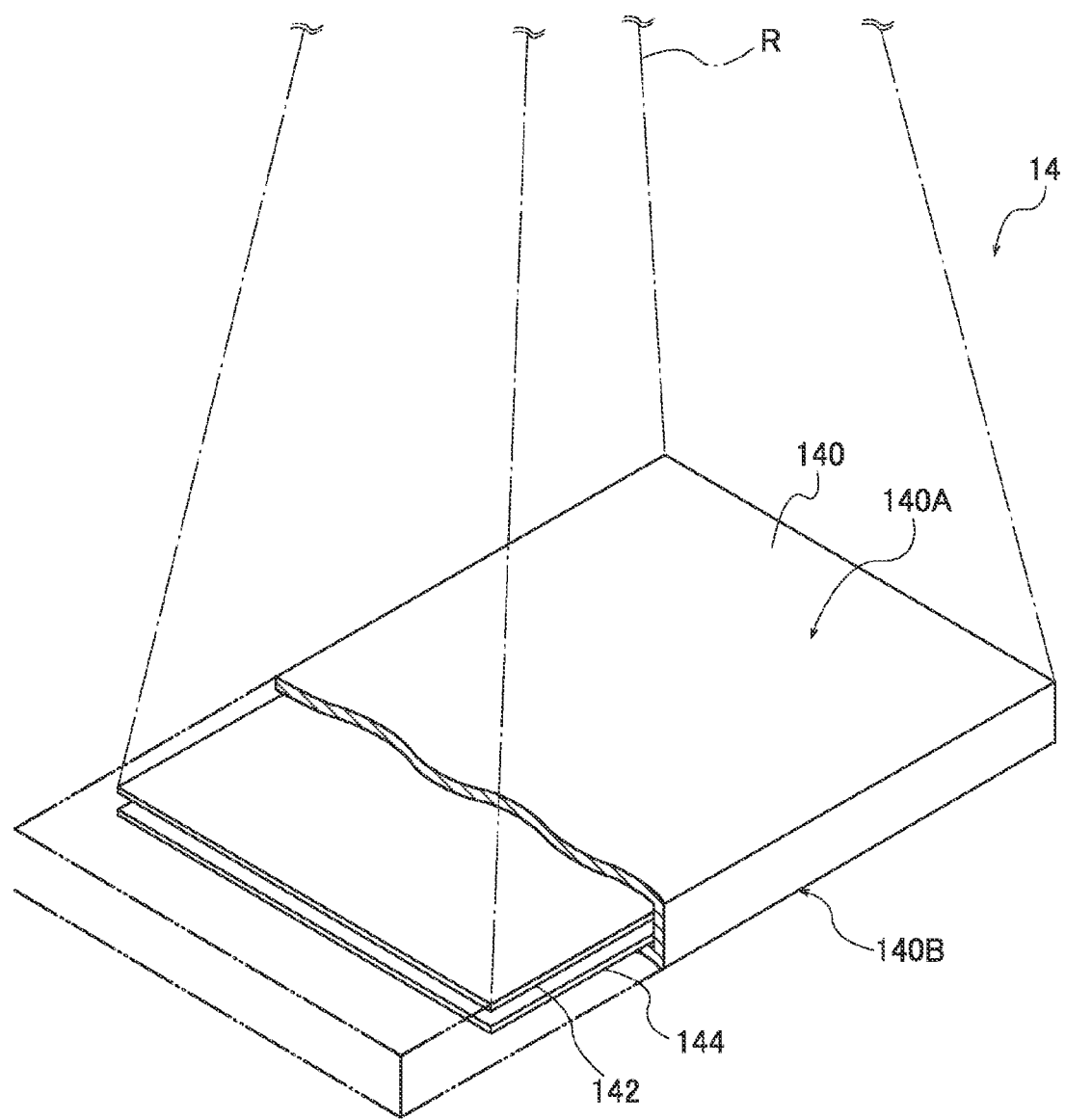
FIG. 2 is a perspective view illustrating a radiographic image detector (electronic cassette) of a radiographic image capture device according to the first exemplary embodiment in which a portion of a housing is removed for convenience.

As illustrated in FIG. 2, the radiographic image detector 14 is equipped with a flat plate shaped housing 140 with a specific thickness along the radiation R irradiation direction. The housing 140 includes an irradiation face 140A on the face on the side facing towards the radiation irradiation device 12, and the irradiation face 140A is manufactured from a material that at least transmits the radiation R.

A radiation detection panel 142 and a signal processing board 144 are housed inside the housing 140. The radiation detection panel 142 is disposed on the irradiation face 140A side, namely the side that faces the radiation irradiation device 12, and the signal processing board 144 is disposed on a non-irradiation face 140B side facing towards the irradiation face 140A. The radiation detection panel 142 includes a function to generate radiographic image data based on the radiation R that has been irradiated from the radiation irradiation device 12 and passed through the investigation subject 18. The signal processing board 144 controls the operation of the radiation detection panel 142, and includes a function for transmitting the radiographic image data generated by the radiation detection panel 142 to the console 16.

[System Configuration of Radiographic Image Detector]

1. System Configuration of Radiation Detection Panel

Figure 3:
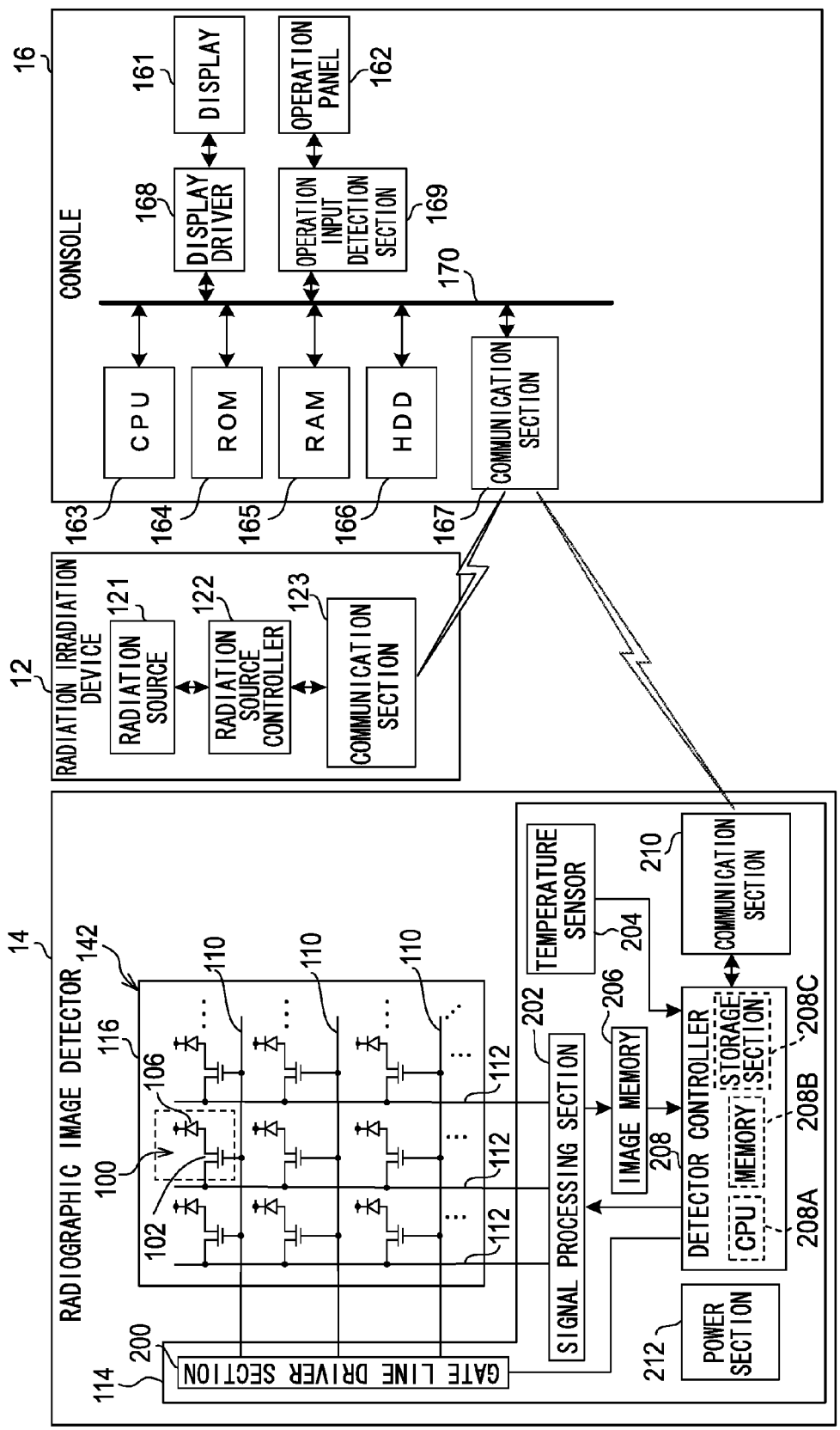
FIG. 3 is an overall block circuit diagram illustrating a radiographic image capture device according to the first exemplary embodiment.

As illustrated in FIG. 3, the radiation detection panel 142 of the radiographic image detector 14 is equipped with a TFT matrix substrate 116. Gate lines 110 (scan signal lines) and data lines 112 (image data output signal lines) are arrayed on the TFT matrix substrate 116. The gate lines 110 extend in a gate line extension direction (for example a row direction) and plural of the gate lines 110 are arrayed at a fixed separation along a data line extension direction (for example a column direction). The data lines 112 extend along the data line extension direction and plural of the data lines 112 are arrayed at a fixed separation along the gate line extension direction. Detection devices 100 are disposed at intersecting portions between the gate lines 110 and the data lines 112. Light (radiographic image data) that has been converted from the radiation R is detected in the detection devices 100, and the detected light is converted into electrical signals.

Each of the detection devices 100 is configured with a Thin Film Transistor (TFT) 102 and a photoelectric conversion element 106, with the respective TFTs 102 and photoelectric conversion elements 106 configuring series circuits. One main electrode of each of the TFTs 102 (drain electrode; appended with the reference numeral 102E in FIG. 6) is connected to one of the data lines 112. The main electrode at the other end (source electrode; appended with the reference numeral 102D in FIG. 6) is connected to one electrode (appended with the reference numeral 106A in FIG. 5 and FIG. 6) of the photoelectric conversion element 106. The gate electrode of each of the TFTs 102 (appended with the reference numeral 102A in FIG. 6) is connected to one of the gate lines 112. The TFTs 102 are switching elements that perform switching between conducting operation (ON) and non-conducting operation (OFF) according to a drive signal (scan signal) supplied to their respective gate electrodes. The other electrode of each of the photoelectric conversion elements 106 (appended with the reference numeral 106E in FIG. 5 and FIG. 6) is connected to a fixed electrical potential. In the photoelectric conversion elements 106, light signals converted from the radiation R as radiographic image data are converted into electrical signals, and these electrical signals are capable of being temporarily stored as charges (radiographic image data).

2. System Configuration of Signal Processing Board

As illustrated in FIG. 3, the signal processing board 144 of the radiographic image detector 14 includes a gate line driver section 200, a signal processing section 202, a temperature sensor 204, an image memory 206, a detector controller 208, a communication section 210, and a power section 212. Some or all of the functions of the signal processing section 202 may be mounted on flexible substrates 182, described later, instead of on the signal processing board 144.

The gate line driver section 200 is connected to the gate lines 110 that extend over the TFT matrix substrate 116, and supplies TFT 102 drive signals to the gate lines 110. The gate line driver section 200 is drawn in FIG. 3 as being disposed further to the outside and along a first edge of the TFT matrix substrate 116 (in this case the left hand side edge). In practice, the signal processing board 144 is disposed facing towards the radiation detection panel 142, and so the gate line driver section 200 is disposed on the non-irradiation face 140B side along the first edge of the TFT matrix substrate 116 and overlapping with the TFT matrix substrate 116. Moreover, the gate line driver section 200 may be disposed on the first edge of the TFT matrix substrate 116 or on the other edge of the TFT matrix substrate 116 that opposes the first edge.

The signal processing section 202 is connected to the data lines 112 that extend over the TFT matrix substrate 116. In the signal processing section 202, the radiographic image data read from the detection devices 100 is acquired through the data lines 112. In cases in which the signal processing section 202 is provided to the signal processing board 144, similarly to the gate line driver section 200, the signal processing section 202 is also drawn in FIG. 3 as being disposed further to the outside along a second edge (in this case the bottom edge) that is adjacent to the first edge of the TFT matrix substrate 116. In practice the signal processing board 144 is disposed facing towards the radiation detection panel 142, and so the signal processing section 202 is disposed on the non-irradiation face 140B side along the second edge of the TFT matrix substrate 116 and overlapping with the TFT matrix substrate 116. Moreover, the signal processing section 202 may be disposed on the second edge and also on another edge of the TFT matrix substrate 116 that opposes the second edge. Note that devices, circuits and systems mounted to the signal processing board 144 other than the gate line driver section 200 and the signal processing section 202 are also disposed overlapping with the TFT matrix substrate 116. Note that in the radiographic image capture device 10 according to the first exemplary embodiment, some of, or all of, the functions of the signal processing section 202 are provided to the flexible substrates 182, and configuration of the signal processing section 202 on the flexible substrates 182 is described later.

When radiographic image data has been accumulated in the radiation detection panel 142 during imaging a radiographic image, first the gate line driver section 200 is employed to select the respective gate lines 110. A drive signal is then supplied to the respective gate line 110. The TFTs 102 of all the detection devices 100 connected to the gate line 110 adopt a conducting state due to being supplied with the drive signal, and the radiographic image data that has been temporarily accumulated in the photoelectric conversion elements 106 is read through the data lines 112 and into the signal processing section 202. In the signal processing section 202, the charges are accumulated in sample-and-hold circuits provided to correspond to each of the data lines 112 (charge amplifier; appended with the reference numeral 220 in FIG. 4).

In the signal processing section 202, the sample-and-hold circuits 220 are selected in sequence along the gate line extension direction, and the radiographic image data accumulated in the sample-and-hold circuits 220 are read in sequence. When the radiographic image data accumulated in all of the detection devices 100 connected to the selected gate line 110 has been read, the gate line driver section 200 selects the gate line 110 for the next step in the data line extension direction. In a similar processing sequence, the signal processing section 202 sequentially selects the sample-and-hold circuits 220, and then performs reading of the radiographic image data accumulated in the detection devices 100 that are connected to the selected gate lines 110. It is possible to acquire a radiographic image that has been imaged in two-dimensions as electrical signals (electronic data) when all of the radiographic image data accumulated in the radiation detection panel 142 have been read.

Figure 4:
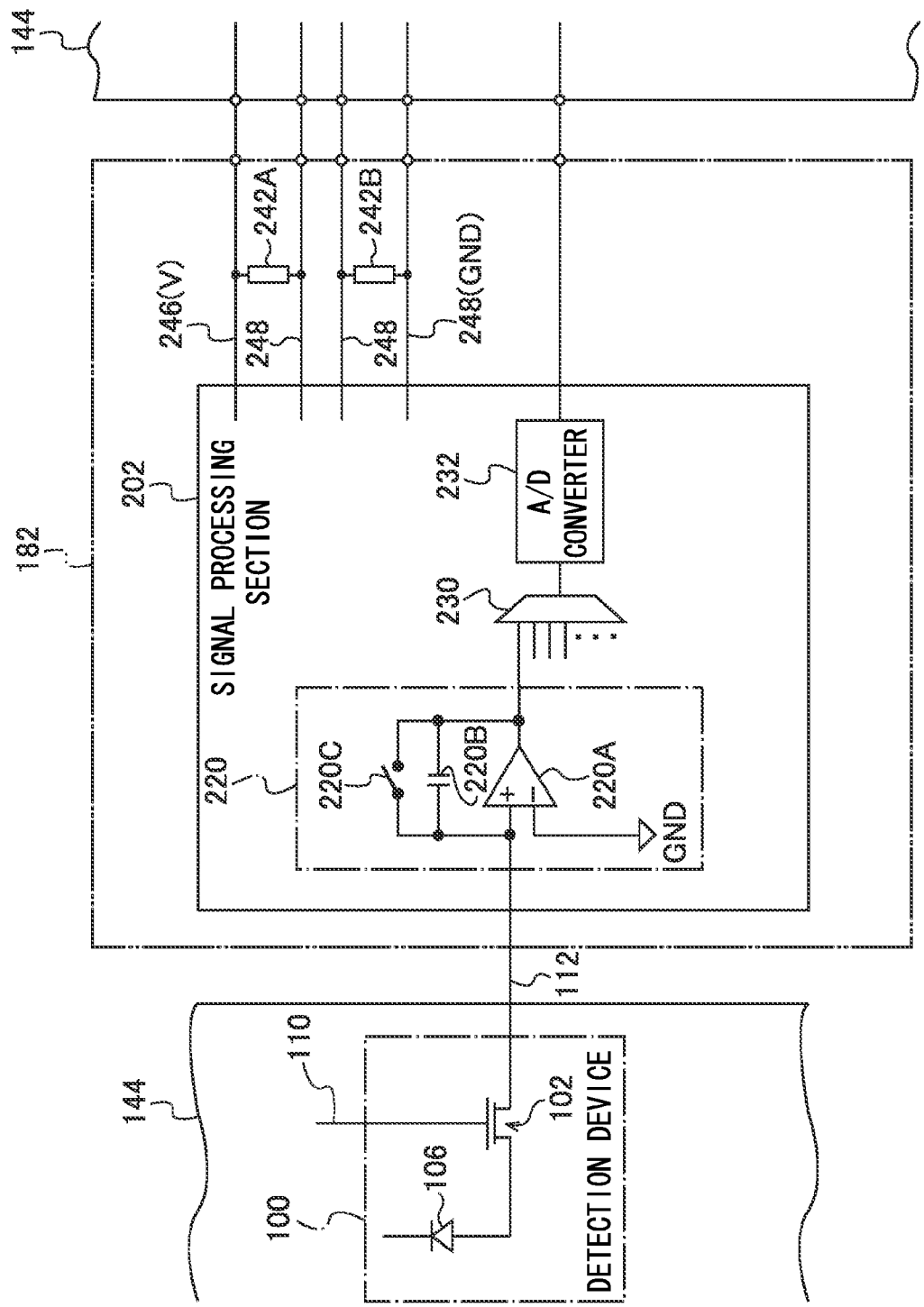
FIG. 4 is a circuit diagram illustrating relevant portions of a signal processing section mounted on a detection device and a flexible substrate of the radiation detection panel illustrated in FIG. 3.

As illustrated in FIG. 4, in the radiographic image capture device 10 according to the first exemplary embodiment, the signal processing section 202 is provided to the flexible substrate 182. In this case the signal processing section 202 is mounted, specifically as an integrated circuit (IC), on the flexible substrate 182 as a single electronic component (first electronic component). The signal processing section 202 is equipped with the sample-and-hold circuits 220, a multiplexer 230 and an analogue-to-digital (A/D) converter 232.

The sample-and-hold circuits 220 are disposed one for each of the data lines 112, and are each equipped with an operational amplifier 220A, a condenser 220B and a switch 220C. The condenser 220B and the switch 220C are both electrically connected in parallel between the input and output of the operational amplifier 220A. The radiographic image data (charge signals) transmitted from the detection devices 100 through the data lines 112 are held in the sample-and-hold circuits 220. The sample-and-hold circuits 220 convert charge signals from the respective operational amplifiers 220A and the condensers 220B into analogue signals (voltage signals: radiographic image data). Namely, the sample-and-hold circuits 220 include a function as a charge amplifier to convert the charges accumulated in the detection devices 100 into a voltage. The switches 220C of the sample-and-hold circuits 220 are employed as reset circuits to perform discharge of charge signals accumulated in the condensers 220B.

The analogue signals (output signals) converted in the sample-and-hold circuits 220 are serially input to the multiplexer 230. The multiplexer 230 serially outputs the analogue signals to the analogue-to-digital converter 232. The analogue-to-digital converter 232 is equipped with an analogue-to-digital conversion processing function that converts analogue signals into digital signals. Namely, the analogue-to-digital converter 232 sequentially converts serially input analogue signals into digital signals (radiographic image data).

Power is supplied from the signal processing board 144 to the signal processing section 202. The power is supplied through power supply lines 246 and 248 disposed on the flexible substrates 182. The power supply lines 246 supply a circuit drive voltage (V) and the power supply lines 248 supply a circuit reference voltage (GND).

Condensers 242A, 242B and so on to 242F are each electrically connected as electronic components in parallel between the power supply lines 246 and the power supply lines 248 (across the power source). The condensers 242A, 242B, and so on to 242F function as smoothing condensers to reduce power noise. Power noise supplied to the signal processing section 202, in particular to the analogue-to-digital converter 232, is reduced by the condensers 242A, 242B and so on to 242F, raising the processing precision of analogue-to-digital conversion processing. The condenser 242A disposed at a position nearest to the signal processing section 202 is, in the first exemplary embodiment, mounted on the flexible substrate 182 in order to enhance the power noise reduction effect.

As illustrated in FIG. 3, the signal processing section 202 is connected to the image memory 206. The radiographic image data that has been converted into digital signals in the analogue-to-digital converter 232 of the signal processing section 202 is serially stored in the image memory 206. The image memory 206 is equipped with storage capacity capable of storing a specific number of frames worth of the radiographic image data, and the radiographic image data obtained by imaging radiographic images is sequentially stored in the image memory 206 each time a radiographic image is captured.

A detector controller 208 is connected respectively to the gate line driver section 200, the signal processing section 202, the temperature sensor 204, the image memory 206, the communication section 210 and the power section 212 and performs control thereof. The detector controller 208 is configured including a microcomputer, and the microcomputer is configured with a central processing unit (CPU) 208A, a memory 208B and a storage section 208C. The memory 208B is equipped with a read-only memory (ROM) that stores for example a processing program to execute control of the radiographic image detector 14 and random access memory (RAM) for temporarily storing various processing programs and data during processing. The storage section 208C is configured for example by a nonvolatile flash memory that stores data such as radiographic image data stored in the image memory 206.

In the first exemplary embodiment the temperature sensor 204 measures the temperature of a central portion of a bottom face of a phosphor 148 (the face on the non-irradiation face 140B side) as the temperature of the radiographic image detector 14. Data of the temperature measured by the temperature sensor 204 is transmitted to the detector controller 208.

The communication section 210 transmits and receives various data to and from external devices under control from the detector controller 208. The format thereof is not limited, however the communication section 210 according to the first exemplary embodiment is a wireless communication section compatible with a wireless Local Area Network (LAN) standard typified for example by Institute of Electrical and Electronics Engineers (IEEE) 802.11 a/b/g. Specifically, the communication section 210 transmits and receives various types of data for performing control relating to radiographic image capture between the detector controller 208 and the console 16, and performs wireless communication so as to transmit radiographic image data from the detector controller 208 to the console 16.

The power section 212 supplies power to various circuits of the gate line driver section 200, the signal processing section 202, the image memory 206, the detector controller 208, and the communication section 210. In the first exemplary embodiment, a battery (a rechargeable secondary battery) is in-built in the power section 212 to improve the portability of the radiographic image detector 14. Power from the battery is supplied to each of the various circuits. Recharging is performed by connecting the battery to a power source through a recharger, not illustrated in the drawings, such as when the radiographic image detector 14 is not in use.

In the radiographic image detector 14 according to the first exemplary embodiment, start of radiographic image capture is synchronized and operation control started on receipt of a control signal from the console 16. In addition thereto, operation control is automatically started in the radiographic image detector 14 by detecting radiation R irradiated from the radiation irradiation device 12. Namely, the radiographic image detector 14 employs a non-synchronized (synchronization free) method. The output of detection sensors of similar structure to the detection devices 100 that are embedded in the array of the detection devices 100, or the output of detection sensors disposed outside of the array of the detection devices 100, is employed for detection of the radiation R. Moreover, output of photo-sensors that detect light converted from the radiation R may be employed for detection of the radiation R. Note that in the present invention there is no limitation to the radiographic image detector 14 employing a non-synchronized method, and a radiographic image detector may be applied that employs a synchronized method in which start of radiographic image capture is synchronized and operation control started on receipt of a control signal from the console 16.

[System Configuration of Console]

As illustrated in FIG. 3, the console 16 is configured as a server computer, and is equipped with a display 161 and an operation panel 162. The display 161 is a monitor that displays for example an operation menu of the radiographic image capture device 10 and captured radiographic images. The operation panel 162 is equipped for example with plural operation keys and switches, to enable input of various data and operation instructions. The console 16 is equipped with a CPU 163, ROM 164, RAM 165, a Hard Disk Drive (HDD) 166, a display driver 168, an operation input detection section 169 and a communication section 167.

The CPU 163 performs control of the operation of the console 16 overall. Various programs such as a control program for controlling operation of the console 16 are stored in the ROM 164. The RAM 165 is temporarily stored with various data. Various data are stored in the hard disk drive 166. Control is performed in the display driver 168 to display various data on the display 161. Detection of operation state with respect to the operation panel 162 is performed by the operation input detection section 169. In the communication section 167, various data such as exposure conditions is transmitted and received to and from the radiation irradiation device 12, and various data such as radiographic image data is transmitted and received to and from the radiographic image detector 14. In the communication section 167, similarly to in the communication section 210 of the radiographic image detector 14, data transmitting and receiving is performed by wireless communication.

In the console 16 the CPU 163, the ROM 164, the RAM 165, the HDD 166, the display driver 168, the operation input detection section 169 and the communication section 167 are connected together by a system bus (common bus line) 170. Consequently, the CPU 163 is able to respectively access the ROM 164, the RAM 165 and the HDD 166 through the system bus 170. The CPU 163 is also able to control the display of various data on the display 161 through the system bus 170 and the display driver 168. The CPU 163 is also able to ascertain the operation state of a user of the operation panel 162 through the operation input detection section 169 and the system bus 170. Moreover, the CPU 163 is able to control transmission and reception of various data to and from the radiation irradiation device 12 and the radiographic image detector 14, respectively, through the system bus 170 and the communication section 167.

[System Configuration of Radiation Irradiation Device]

As illustrated in FIG. 3, the radiation irradiation device 12 is equipped with a radiation source 121, a radiation source controller 122 and a communication section 123. In the communication section 123 transmission and reception of various data such as exposure conditions is performed to and from the console 16. In the radiation source controller 122, control of the radiation source 121 is performed based on exposure conditions received through the communication section 123.

The radiation source controller 122 is equipped with a microcomputer similarly to the detector controller 208 of the radiographic image detector 14. Data such as the exposure conditions received through the communication section 123 is stored in the memory of the microcomputer. The exposure conditions include at least data that includes for example tube voltage, tube current, and exposure time. The radiation source controller 122 controls irradiation of the radiation R from the radiation source 121 based on such exposure conditions.

[Equipment Structure of Radiation Detection Panel]

1. Overall Structure of Radiation Detection Panel

Figure 5:
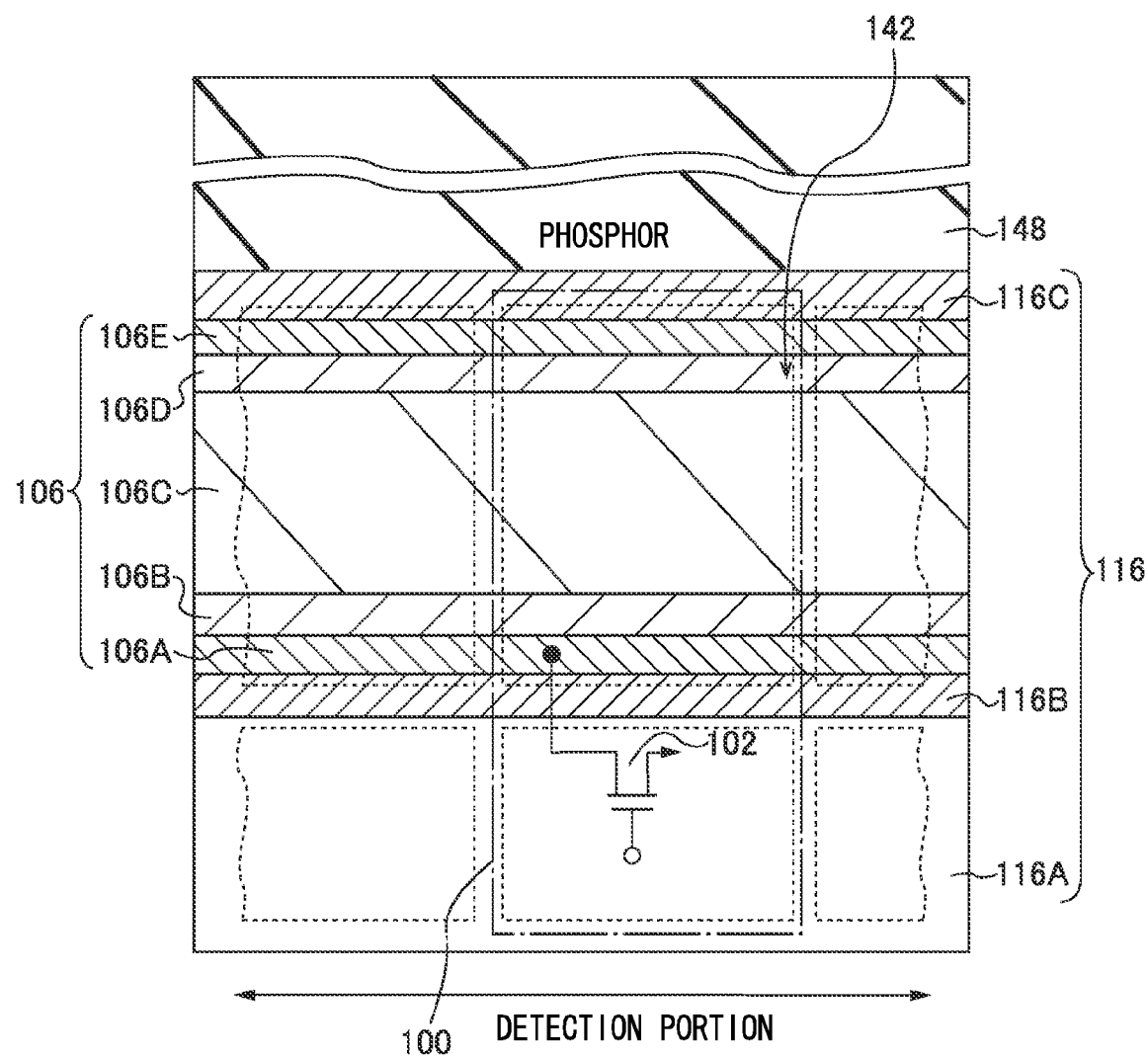
FIG. 5 is a schematic vertical structure cross-section illustrating an equipment structure of a photoelectric conversion device and phosphor of the radiation detection panel illustrated in FIG. 3.

The radiation detection panel 142 of the radiographic image detector 14 according to the first exemplary embodiment is, as illustrated in FIG. 5, equipped with the TFT matrix substrate 116, and the phosphor (scintillator) 148 disposed on the TFT matrix substrate 116. The detection devices 100 are disposed on the TFT matrix substrate 116. For convenience, a single detection device 100 is illustrated here as an equivalent value circuit. A single detection device 100 is the smallest resolution unit of 1 pixel. The detection devices 100 are disposed on an insulating substrate 116A, and equipped with stacked-layer structure with the photoelectric conversion elements 106 above the TFTs 102 that are provided at the insulating substrate 116A.

2. Structure of Phosphor (Scintillator)

As illustrated in FIG. 5, a transparent insulating film 116C is disposed on the uppermost layer of the TFT matrix substrate 116, and the phosphor 148 is disposed on the transparent insulating film 116C. The phosphor 148 is disposed over substantially the entire area of the TFT matrix substrate 116. The phosphor 148 is disposed above the photoelectric conversion elements 106 with the transparent insulating film 116C interposed therebetween, and so is capable of absorbing the radiation R that is incident from the phosphor 148 side (from the top in FIG. 5) and converting it into light. Moreover, the phosphor 148 is also able to absorb radiation R that is incident from the insulating substrate 116A side (from the bottom in FIG. 5) and convert it into light.

The light wavelength region emitted by the phosphor 148 is set according to the photoreception sensitivity of the photoelectric conversion elements 106. As an example, photodiodes employing amorphous silicon (a-Si) or Metal Insulator Semiconductor (MIS) transistors are employed as the photoelectric conversion elements 106. In such cases, in consideration of the photoreception sensitivity characteristics of a-Si, the light wavelength region can be set in the visible light region (wavelength 360 nm to 830 nm). In the radiographic image detector 14, in order to enable capture of radiographic images in cases in which a-Si is employed in the photoelectric conversion elements 106, preferably the light emitted by the phosphor 148 includes a green wavelength region where the photoreception sensitivity of a-Si is at a maximum.

In cases in which X-ray images are captured using X-rays as the radiation R, preferably the phosphor 148 employed contains cesium iodide (CsI). Moreover, the phosphor 148 is in particular preferably formed from thallium doped cesium iodide CsI(Tl) or gadolinium oxysulfide GOS ($Gd_2O_2S$:Tb) that have an emission spectrum in the wavelength region of 400 nm to 700 nm during X-ray irradiation. The emission peak wavelength of CsI (Tl) in the visible light region is at 565 mm. Note that the radiation R is not limited to X-rays in the present invention, and radiation R is used with the meaning of including at least radiations employed in medicine, such as gamma rays, an electron beam, a neutron beam, a proton beam and a heavy particle beam.

In the first exemplary embodiment, the phosphor 148 is basically manufactured as a separate member (separate component) to the TFT matrix substrate 116, namely to the radiation detection panel 142. The phosphor 148 is then mounted to the radiation detection panel 142 in a manufacturing process (assembly process) of the radiographic image detector 14.

3. Structure of Photoelectric Conversion Elements

Figure 6:
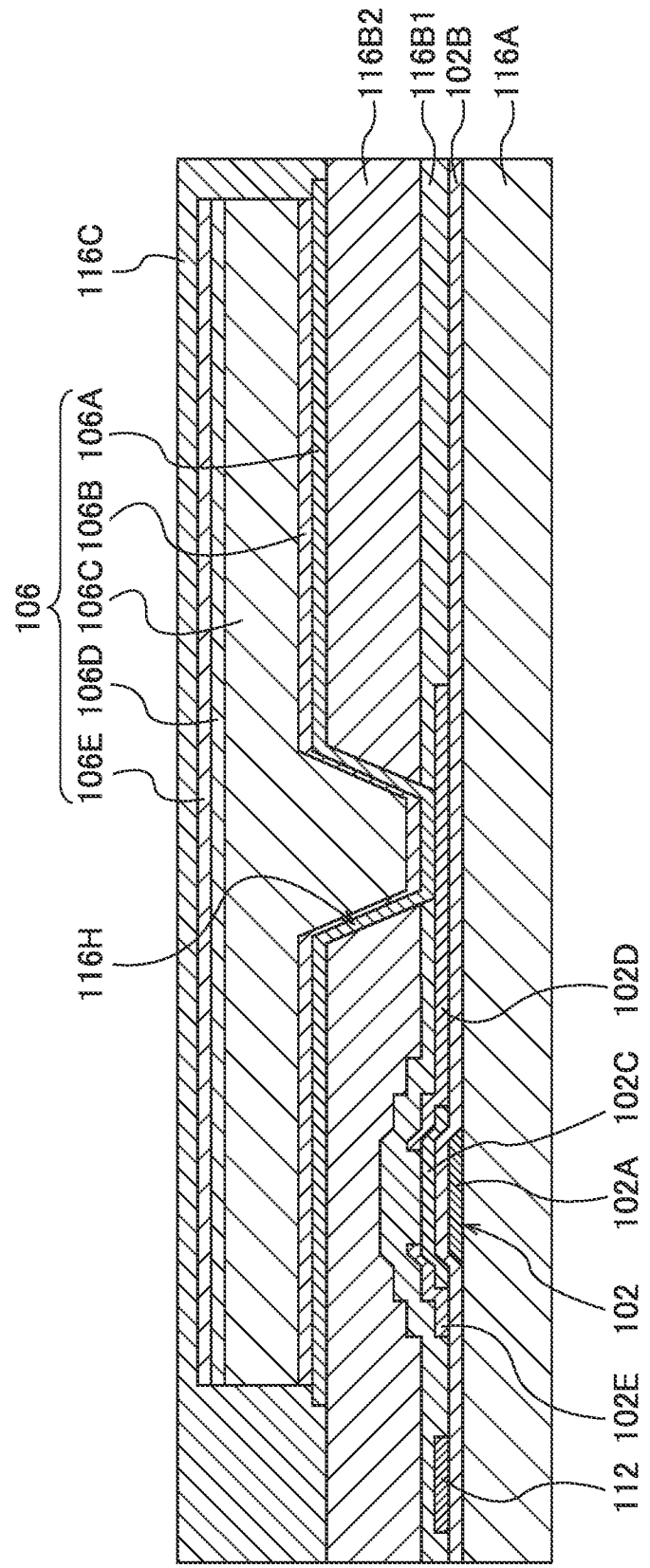
FIG. 6 is a vertical structure cross-section illustrating relevant portions of a specific equipment structure of a TFT and a photoelectric conversion device of the radiation detection panel illustrated in FIG. 3.

As illustrated in FIG. 5 and FIG. 6, the detection devices 100 of the first exemplary embodiment have a PIN structure, and employ the photoelectric conversion elements 106 that utilize an indirect conversion method. The photoelectric conversion elements 106 are disposed on the insulating substrate 116A of the TFT matrix substrate 116. The photoelectric conversion elements 106 are configured with a stacked-layer structure that is stacked in the sequence with one electrode (lower electrode) 106A, a first semiconductor layer 106B, a second semiconductor layer 106C, a third semiconductor layer 106D and another electrode (upper electrode) 106E.

The electrode 106A is disposed on the insulating substrate 116A with an insulating film 116B interposed therebetween, and is divided into each of the detection devices 100 (each of the detection portions or each of the pixel portions). The insulating film 116B is configured in the first exemplary embodiment, as illustrated in FIG. 6, as a multi-layer film of a TFT protection film 116B1 formed with a flattening film 116B2 as the upper layer. The TFT protection film 116B1 is, for example, formed using a SiNx film that is film-formed using a Chemical Vapor Deposition (CVD) method. A coated insulation film formed from a photosensitive organic material with low permittivity is, for example, employed for the flattening film 116B2.

In cases in which the film thickness of the first semiconductor layer 106B to the third semiconductor layer 106D is thick, at about 1 µm, as long as a conductive material is employed for the electrode 106A there are substantially no limitations to whether or not it is transparent or non-transparent. Accordingly, a transparent or nontransparent conductive material may be employed for the electrode 106A. As transparent conductive materials, for example, a material such as indium tin oxide (ITO) may be employed. As non-transparent conductive materials, for example, a material such as aluminum, an aluminum alloy, or silver may be employed. However, in cases in which the film thickness of the first semiconductor layer 106B to the third semiconductor layer 106D is thin (for example in the range of from 0.2 µm to 0.5 µm), light cannot be sufficiently absorbed by the first semiconductor layer 106B to the third semiconductor layer 106D. If this light is illuminated onto the TFTs 102 then this is a cause of an increase in leak current between the main electrodes 102D, 102E of the TFTs 102. Consequently, preferably a non-transparent, namely a light blocking, conductive material, or multi-layer film thereof, is employed for the electrode 106A in cases in which the film thickness of the first semiconductor layer 106B to the third semiconductor layer 106D is thin.

The first semiconductor layer 106B is disposed on the electrode 106A, the second semiconductor layer 106C is disposed on the first semiconductor layer 106B, and the third semiconductor layer 106D is disposed on the second semiconductor layer 106C. Since a PIN structure is employed in the photoelectric conversion elements 106 according to the first exemplary embodiment, the first semiconductor layer 106B is configured from an n+ type a-Si layer. The second semiconductor layer 106C is configured from an i-type a-Si layer. The third semiconductor layer 106D is configured from a p+ type a-Si layer. In the second semiconductor layer 106C charges (pairs of free electrons and free holes) are generated from light that has been converted by the phosphor 148. The first semiconductor layer 106B is employed as a contact layer, and is electrically connected to the electrode 106A. The third semiconductor layer 106D is similarly employed as a contact layer and is electrically connected to the upper electrode 106E.

The upper electrode 106E is provided at the third semiconductor layer 106D, with an individual upper electrode 106E for each of the detection devices 100. A conductive material that has high transparency, such as for example ITO or Indium Zinc Oxide (IZO), is employed as the upper electrode 106E. Although omitted from illustration in FIG. 5 and FIG. 6, lines are connected to the upper electrodes 106E to supply a fixed voltage thereto.

In the first exemplary embodiment, in addition to the first semiconductor layer 106B to the third semiconductor layer 106D, the photoelectric conversion elements 106 are also configured including the electrodes 106A and 106E. Moreover, a MIS structure may be employed in the photoelectric conversion elements 106.

4. TFT Structure

As illustrated in FIG. 6, each of the TFTs 102 of the detection devices 100 is disposed at a region corresponding to and below the electrode 106A of the photoelectric conversion element 106, and above the insulating substrate 116A. The TFTs 102 are disposed at regions that overlap with the electrodes 106A of the photoelectric conversion elements 106 when viewed in plan view along an orthogonal direction to the surface of the insulating substrate 116A. Namely, the TFTs 102 and the photoelectric conversion elements 106 form three-dimensional stacked layers on the insulating substrate 116A. The surface area occupied by the detection devices 100 is accordingly compressed in a plane direction co-planar to the surface of the insulating substrate 116A of the detection devices 100.

Each of the TFTs 102 is equipped with a gate electrode 102A, a gate insulating film 102B, an active layer (channel layer) 102C, one main electrode (for example a drain electrode) 102E, and another main electrode (for example a source electrode) 102D. The gate electrode 102A is disposed on the surface of the insulating substrate 116A. The gate electrode 102A in the first exemplary embodiment is formed in the same conductive layer and from the same conductive material as the gate line 110. The gate insulating film 102B is disposed over substantially the entire surface of the insulating substrate 116A with the gate electrode 102A interposed therebetween. The active layer 102C is disposed on the surface of the gate insulating film 102B so as to overlap with the gate electrode 102A. The main electrodes 102D and 102E are disposed separated from each other on the active layer 102C and above the gate electrode 102A. The main electrodes 102D and 102E are, in the first exemplary embodiment, formed in the same conducting layer and from the same conductive material as each other.

In the radiographic image detector 14 according to the first exemplary embodiment, the active layer 102C of each of the TFTs 102 is formed from a-Si. The active layer 102C may also be configured with an amorphous oxide material. An oxide material containing at least one of In, Ga or Zn (for example In—O) is employed as such an amorphous oxide material. An oxide material including at least two of In, Ga, and Zn (for example In—Zn—O, In—Ga—O, or Ga—Zn—O) is preferably employed. An oxide material including In, Ga, and Zn is more preferably employed. Specifically, as such an In—Ga—Zn—O amorphous oxide material, an amorphous oxide material whose composition in a crystalline state would be expressed by $InGaO_3(ZnO)_m$ (where m is an integer less than 6) is preferred. In particular $InGaZnO_4$ is more preferred. The radiation R such as X-rays is not absorbed, or any absorption is limited to an extremely small amount, in TFTs 102 whose active layer 102C is formed from amorphous oxide materials, and so generation of noise can be effectively suppressed.

An alkali-free glass such as that employed in liquid crystal displays is employed as the insulating substrate 116A in the first exemplary embodiment. An amorphous oxide material is employed here as the active layer 102C of the TFTs 102, and it is possible to employ an organic photoelectric conversion material in place of the first semiconductor layer 106B to the third semiconductor layer 106D of the photoelectric conversion elements 106. In such cases, it is possible to employ a low temperature process for film-forming the active layer 102C and the organic photoelectric conversion material respectively. Consequently, there is no limitation to substrates with high heat resistance such as semiconductor substrates, quartz substrates, or glass substrates, and it is possible to employ a flexible substrate such as a plastic, or an aramid (wholly aromatic polyamide) or a bionanofiber substrate as the insulating substrate 116A. Specifically, flexible substrates that may be employed as the insulating substrate 116A include polyesters such as for example polyethylene terephthalate, polybutylene phthalate, and polyethylene naphthalate, polystyrene, polycarbonate, polyethersulphone, polyarylate, polyimide, polycyclic olefin, norbornene resin, and poly (chloro-trifluoro-ethylene). Employing such a resin flexible substrate, such as one made from plastic, enables a reduction in weight of the radiographic image detector 14 to be achieved. Achieving a reduction in weight enhances portability characteristics such as for carrying around and handling.

Moreover, other layers may also be provided to the insulating substrate 116A, such as an insulating layer to secure insulation, a gas barrier layer to suppress the transmission of moisture and/or oxygen, and/or an undercoat layer to improve flatness or adhesion for example to the electrodes.

Since high-temperature processing at temperatures of 200 degrees C. or higher can be employed with aramids that are usable as the insulating substrate 116A, high temperature curing of a transparent electrode material is enabled. A low resistance transparent electrode material can accordingly be realized. Moreover, aramids are also compatible with automatic packaging processes of driver ICs to configure the gate line driver section 200, including solder reflow processing at high temperatures of 200 degrees C. or higher. Aramids also have a thermal expansion coefficient that is close to that of ITO and a glass substrate, so post manufacture warping of the insulating substrate 116A can be reduced, and the insulating substrate 116A does not readily break. Aramids also have a higher mechanical strength than the mechanical strength of a glass substrate, and so enable a thinner substrate insulating substrate 116A to be realized. However, there is no limitation to a single-layer substrate structure and a composite substrate structure of an ultrathin glass substrate laminated together with an aramid may also be employed as the insulating substrate 116A Bionanofibers usable as the insulating substrate 116A are composites of cellulose microfibril bundles (bacterial cellulose) produced by a bacterium (*Acetobacter xylinum*) and a transparent resin. Cellulose microfibril bundles have, for example, a minute width dimension of 50 nm, a size that is around ¹/₁₀ that of visible light wavelengths, and also have high strength, high elasticity, and low thermal expansion characteristics. Impregnating bacterial cellulose with a transparent resin such as an acrylic resin or an epoxy resin and curing enables a bionanofiber to be produced that exhibits a light transmittance of about 90% to 500 nm wavelength even when fibers are included at 60 to 70%. Bionanofibers have a low thermal expansion coefficient (3 to 7 ppm) comparable to silicon crystals, a strength comparable to steel (460 MPa), high elasticity (30 GPa), and are flexible. A thinner insulating substrate 116A can accordingly be realized in comparison for example to a glass substrate.

The insulating film 116B is disposed over the entire region of the insulating substrate 116A, including the main electrodes 102D and 102E of the TFTs 102. The electrode 106A of each of the photoelectric conversion elements 106 passes through a connection hole 116H disposed at the insulating film 116B, and is electrically connected to the main electrode 102D.

[Equipment Structure of Radiation Detector]

1. Outline Overall Structure of Radiographic Image Detector

As illustrated in FIG. 7A, the radiographic image detector 14 includes the radiation detection panel 142, the signal processing board 144, the phosphor 148, a support member 180, the flexible substrates 182 and the housing 140. The radiation detection panel 142, the phosphor 148, the support member 180 and the signal processing board 144 are disposed in sequence from the irradiation face 140A side towards the non-irradiation face 140B side. These members are disposed so as to overlap with each other. One end of each of the flexible substrates 182 is electrically connected to the radiation detection panel 142, and the other end is electrically connected to the signal processing board 144. The radiation detection panel 142, the phosphor 148, the support member 180, the signal processing board 144 and the flexible substrates 182 are internally housed in the housing 140.

In the radiographic image detector 14 according to the first exemplary embodiment, light that has been converted from the radiation R is read from the radiation R irradiation face 140A side of the scintillator by employing an Irradiation Side Sampling (ISS: TFT substrate face incident) method. Hence, the radiation detection panel 142 is housed in the housing 140 with the insulating substrate 116A illustrated in FIG. 5 and FIG. 6 disposed towards the irradiation face 140A side and the phosphor 148 disposed towards the non-irradiation face 140B side, and the radiation detection panel 142 is mounted at the inside face of a top plate that is the back face side of the irradiation face 140A. Double sided adhesive tape is employed, for example, for mounting in cases in which the radiation detection panel 142 is directly mounted to the top plate inside face. Moreover, the radiation detection panel 142 is mechanically mounted to the housing 140 through the support member 180. Note that the radiographic image detector 14 is not limited to use with an ISS method, and may also be employed in a scintillator face incident method in which light that has been converted from the radiation R is read from the non-irradiation face 140B side of the scintillator that is on the opposite side to the radiation R irradiation face 140A.

The support member 180 mainly functions as a reinforcement member to raise the mechanical strength of the housing 140. The support member 180 is disposed at a thickness direction central portion of the housing 140, and is disposed substantially parallel to the irradiation face 140A and the non-irradiation face 140B of the housing 140. The size of the support member 180 as viewed in plan view (longitudinal dimension×width dimension) is slightly smaller than the size of the irradiation face 140A and the non-irradiation face 140B as viewed along the same direction. Moreover, the size of the support member 180 is larger than the respective sizes of the radiation detection panel 142, the phosphor 148 and the signal processing board 144 as viewed along the same direction.

Although not illustrated in detailed cross-section in FIG. 7A, the support member 180 is configured by a 3 layer structure equipped with a chassis, a reinforcement plate and a vapor deposition plate that are stacked in sequence from the non-irradiation face 140B towards the irradiation face 140A. The chassis is for example configured by aluminum. The reinforcement plate 180B is for example configured from carbon. The vapor deposition plate is configured for example from aluminum.

The radiation detection panel 142 is disposed on the irradiation face 140A side of the support member 180, with the phosphor 148 interposed therebetween. There are no particular limitations to the thickness of the radiation detection panel 142, which may be set for example from 0.6 mm to 0.8 mm.

Moreover, the thickness of the phosphor 148 is set for example from 0.5 mm to 0.7 mm.

The signal processing board 144 is disposed on the non-irradiation face 140B side of the support member 180. In FIG. 7A, the signal processing board 144 is schematically illustrated as a single configuration element (component), and in practice is a wiring board mounted with various circuits configuring the gate line driver section 200 and the like illustrated in FIG. 3. The circuits include such components as integrated circuits (IC), resistors, capacitor elements, and condensers. Moreover, a printed wiring board is for example employed as the wiring board. Note that circuits may be distributed and mounted across plural wiring boards.

2. Housing Structure

As illustrated in FIG. 7A and FIG. 7B, the housing 140 is a hollow rectangular shaped body including the irradiation face 140A that is the top plate, the non-irradiation face 140B that is separated from and faces the irradiation face 140A to form the bottom plate, and side sections (side plates) that are disposed around the periphery of the irradiation face 140A and the non-irradiation face 140B. In the radiographic image detector 14 of the first exemplary embodiment, an insulator is employed for at least the outside surfaces and the inside surfaces of the housing 140 in order to suppress the influence of external electromagnetic noise to a minimum. Reference to an insulator being employed for at least the surfaces is used here to include both cases in which the whole of the housing 140 is an insulator and also cases in which the base member of the housing 140 is a conductor and the surface thereof is an insulator (the surface has been treated with insulation processing). For example, an example of the former is manufacturing the housing 140 from an insulating resin. Examples of the latter are forming the housing 140 from an aluminum base whose surface has been treated to form an oxidized coating film, and manufacturing the housing 140 using a similar base but coating with an insulating coating on the surface.

In the first exemplary embodiment, materials for the housing 140 are selected to enhance handling performance of the radiographic image detector 14 and to realize both a lighter weight and a higher rigidity. A Carbon Fiber Reinforced Plastic (CFRP) of carbon fibers coated with an insulating resin may be employed as the housing 140 to achieve such demands. An epoxy resin may for example be employed as the insulating resin.

3. Flexible Substrate Structure

As illustrated in FIG. 7A and FIG. 7B, the signal processing section 202 (an electronic component or a first electronic component) illustrated in FIG. 4 is mounted as two signal processing sections 202 on the two flexible substrates 182. The signal processing sections 202 are mounted here to the surface of the flexible substrates 182 so as to face towards the inner wall face of the non-irradiation face 140B of the housing 140. The flexible substrates 182 are wiring cables that electrically connect between the data lines 112 of the radiation detection panel 142 and the signal processing sections 202, and between the signal processing sections 202 and the signal processing board 144. In the first exemplary embodiment, the flexible substrates 182 are configured with COF type substrates with wiring lines 182L1, wiring lines 182L2 and wiring lines 182L3 provided at a base film 182B. A solder resist 182R is coated onto the wiring lines 182L1 to the wiring lines 182L3.

A resin film that has at least flexibility and insulating properties is used for the base film 182B. Specifically, a polyimide resin film that has a thickness in the range of 20 μm to 50 μm and an elasticity of 2 GPa to 8 GPa is employed for the base film 182B. Copper (Cu) wiring that has excellent electrical and thermal conductivity is employed for the wiring lines 182L1 to the wiring lines 182L3 at a thickness in the range of 3 μm to 15 μm.

Details are omitted from illustration in the drawings, however one end of each of the flexible substrates 182 (an external terminal, reference numeral omitted) is electrically connected to external terminals of the data lines 112 that lead out to a peripheral portion of the radiation detection panel 142. Examples of such electrical connection include for example interposing a connection medium of for example an anisotropic conductive connector, an anisotropic conductive sheet, an anisotropic conductive film, or an anisotropic conductive rubber, and then employing a thermo-pressure bonding method of application of heat and press-bonding. Electrical connection is made between one end of each of the flexible substrates 182 and the signal processing sections 202 using the wiring lines 182L1. Moreover, the other end of each of the flexible substrates 182 is electrically connected to external terminals that lead out to a peripheral portion of the signal processing board 144 (reference numerals 246, 248 etc.). The thermo-pressure bonding method described above is employed for such electrical connection. Electrical connection between the other end of each of the flexible substrates 182 and the signal processing sections 202 is performed by the wiring lines 182L2 and the wiring lines 182L3.

Moreover, on the same surface as the surface mounted with the signal processing sections 202, the flexible substrates 182 are also mounted with second electronic components 242A to 242D and third electronic components 242E, 242F, between the signal processing sections 202 and the other end of each of the flexible substrates 182. The signal processing sections 202, the second electronic components 242A to 242D and the third electronic components 242E, 242F are arrayed in sequence along the extension directions of the wiring lines 182L2 and the wiring lines 182L3. The second electronic components 242A to 242D and the third electronic components 242E, 242F are all condensers that are electrically connected in parallel between the wiring lines 182L2, 182L3 connected to the external terminals of the power supply lines 246 and the wiring lines 182L2, 182L3 connected to the external terminals of power supply lines 248. The size in plan view of the individual second electronic components 242A to 242D and the third electronic components 242E, 242F is smaller than the size in plan view of the signal processing sections 202 (first electronic components). Specifically, the sizes of the second electronic components and the third electronic components are for example about $1/(\text{several tens})^{th}$ the size of the first electronic components. The weight of the individual second electronic components 242A to 242D and third electronic components 242E, 242F is accordingly light compared with the weight of the signal processing sections 202.

The power source from the signal processing board 144 to the external terminals of the power supply lines 246 is for example supplied at a circuit drive voltage Vcc, and the wiring lines 182L2, 182L3 are employed as power supply lines. A different voltage, for example the circuit reference voltage (ground power source) GND is supplied from the signal processing board 144 to the external terminals of the power supply lines 248, with the wiring lines 182L2, 182L3 employed as power supply lines. Namely, the condensers are employed as smoothing condensers inserted between power supply lines and function to reduce the noise in power supplied to the signal processing sections 202. There is no limitation to always having the following mounting numbers, however in the flexible substrates 182 according to the first exemplary embodiment there are four of the second electronic components 242A to 242D, and two of the third electronic components 242E, 242F, making a total of 6 mounted components.

As illustrated in FIG. 7B, the second electronic components 242A to 242D are arrayed on the signal processing section 202 side, and the third electronic components 242E, 242F are arrayed on the external terminal side at the other end side (the signal processing board 144 side). The second electronic components 242A to 242D are arrayed in sequence in a direction intersecting with, orthogonally in the present example, the direction from the signal processing sections 202 to the external terminals at the other end side (the wiring line 182L2 extension direction; the top-bottom direction in the drawings). Similarly, the third electronic components 242E, 242F are arrayed substantially parallel to the array direction of the second electronic components 242A to 242D.

A central portion of each of the flexible substrates 182 projects out from the side face of the radiation detection panel 142 and from a side face of the signal processing board 144 in a shape looping towards the inner wall of a side section of the housing 140, employing the flexibility of the flexible substrate 182 to pull round and curve to fold back on itself in a circular arc. While in a state without external force applied to the radiographic image detector 14 (a stationary state), the flexible substrates 182 maintain a slight gap at least between themselves and the support member 180 and the inner wall of a side section of the housing 140, so as not to make contact therewith. The gaps are, for example, set at several mm.

As illustrated in FIG. 7A, the side faces of the support member 180 project out further to the outside than the side faces of the signal processing board 144, such that there are regions arising where the support member 180 and the signal processing board 144 do not overlap with each other. The signal processing sections 202 (first electronic components), the second electronic components 242A to 242D and the third electronic components 242E, 242F of the flexible substrates 182 are disposed at these regions between the support member 180 and the inside of the non-irradiation face 140B of the housing 140. The support member 180 accordingly functions as a shielding wall to the radiation R, such that the radiation amount of the radiation R is reduced to for example the signal processing sections 202. As a result, malfunction of the signal processing sections 202 caused by irradiation with the radiation R is effectively suppressed.

Note that although in FIG. 7A there are only two left and right flexible substrates 182 illustrated, in practice plural of the flexible substrates 182 are disposed along edges of the radiation detection panel 142. Moreover, Tape Automated Bonding (TAB) may be employed for the flexible substrates 182.

Moreover, although omitted in the drawings, a flexible substrate electrically connects between the gate lines 110 of the radiation detection panel 142 and the signal processing board 144. This flexible substrate employs a COF type similar to that of the flexible substrates 182, and the gate line driver section 200 is mounted thereto as an electronic component (integrated circuit).

4. Structure of Reinforcement Member

As illustrated in FIG. 7B, the number of the wiring lines 182L1 disposed at a region from the external terminals at one end side (the radiation detection panel 142 side) of the flexible substrates 182 to the signal processing section 202 (first electronic component) is extremely high, and the proportion of flat plane surface area the wiring lines 182L1 occupy per unit surface area is accordingly large. This region is accordingly a high wiring density region. The region from the signal processing section 202 to the second electronic components 242A to 242D is disposed with a large number of the wiring lines 182L2 from the signal processing section 202 towards the external terminals at the other end side (the signal processing board 144 side) of the flexible substrates 182, or with wide line width wiring lines 182L2. Since the proportion of flat plane surface area the wiring lines 182L2 occupy per unit surface area is large, this region is the high wiring density region 184A. In contrast thereto, in a region from the second electronic components 242A to 242D to the third electronic components 242E, 242F, layout is made from the high wiring density region 184A, passing around the second electronic components 242A to 242D, to the external terminals at the other end side, and so the number of the wiring lines 182L3 disposed therein is extremely small. Namely, in this region the proportion of flat plane surface area the wiring lines 182L3 occupy per unit surface area is small, and so this region is the low wiring density region 184B.

In the radiographic image detector 14 according to the first exemplary embodiment, a reinforcement member 186A is provided on at least the wiring lines 182L3 in the low wiring density region 184B of the flexible substrate 182. The reinforcement member 186A raises the mechanical strength of the wiring lines 182L3 disposed at the low wiring density region 184B. The reinforcement member 186A is provided at least between electronic components, specifically between the second electronic components 242A to 242D and the third electronic components 242E, 242F since this is the low wiring density region 184B. In this case, the reinforcement member 186A is provided continuously on the second electronic components 242A to 242D, on the third electronic components 242E, 242F, and between these electronic components.

In order not to impair the flexibility of the flexible substrates 182 and in order to raise the mechanical strength of the wiring lines 182L3 of the low wiring density region 184B, the tensile elasticity of the reinforcement member 186A is set so as to be 1 Mpa or greater and lower than the tensile elasticity of the flexible substrate 182. In addition, the thickness of the reinforcement member 186A is set thicker than the thickness of the flexible substrate 182. The tensile elasticity of the flexible substrate 182 is used to mean the tensile elasticity of the base film 182B, with this determining the overall tensile elasticity of the flexible substrate 182. Moreover, the thickness of the flexible substrate 182 is similarly used to mean the thickness of the base film 182B. In the first exemplary embodiment, the reinforcement member 186A is configured from at least one material out of a styrene polymer, an acrylic resin, an epoxy resin, a urethane resin or a silicone resin. For example, when a styrene polymer is employed as the reinforcement member 186A, the elasticity of the reinforcement member 186A is within a range of 20 MPa to 50 MPa. The thickness of the reinforcement member 186A is preferably set within a range of 100 μm to 1000 μm. The thickness of the reinforcement member 186A in this case is set so as to be uniform. Note that two or more types of the above materials may be stacked together and employed as the reinforcement member 186A.

[Operation of the Radiographic Image Capture Device]

In the radiographic image capture device 10 illustrated previously in FIG. 1, acceleration and vibration are imparted to the radiographic image detector 14 due to external force from handing prior to radiographic image capture, or due to contact or impact accompanying positional adjustment with respect to the investigation subject 18 or adjustment to the posture of the investigation subject 18 either during or immediately prior to imaging. Due to such acceleration or vibration, in the radiographic image detector 14, change in position of the flexible substrate 182 cannot sometimes follow change in position of the rigid bodies of the radiation detection panel 142, the signal processing board 144 and the housing 140. Deformation and vibration accordingly arises in the flexible substrate 182 due to its flexibility. In cases in which the flexible substrate 182 is a COF, the signal processing section 202 (first electronic component), the second electronic components 242A to 242D and the third electronic components 242E, 242F act as masses in a vibration model, and exacerbate the deformation amount and vibration amplitude.

In the flexible substrate 182 according to the first exemplary embodiment, the reinforcement member 186A is provided at the low wiring density region 184B, and accordingly raises the mechanical strength of the wiring lines 182L3 disposed at the low wiring density region 184B. Thus, damage such as creasing or severing of the wiring lines 182L3 can be effectively suppressed or prevented in the enclosed region annotated with the letter B in FIG. 7B. The wiring lines 182L3 extending in the region B are power supply lines that supply power to the signal processing section 202. Effectively suppressing or preventing damage to the wiring lines 182L3 with the reinforcement member 186A enables correct operation, such as of the analogue-to-digital converter 232 of the signal processing section 202, to be performed. Consequently, problems such as line defects are eliminated since radiographic image capture data is not lost.

[Types of Housing of the Radiographic Image Detector]

Figure 8A:
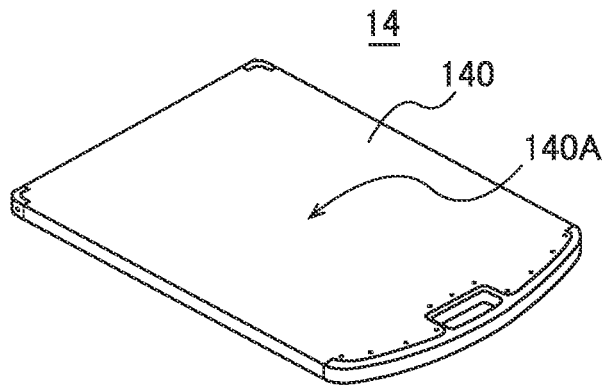
FIG. 8A is a perspective view illustrating a structure of a housing of a radiographic image detector according to the first exemplary embodiment.

The housing 140 of the radiographic image detector 14 according to the first exemplary embodiment as described above is, as illustrated in FIG. 8A, configured with a frameless monocoque. This type of housing 140 is appropriate to providing in a cover (the front face, back face and side faces) the mechanical strength previously provided by a frame, and reducing the weight thereof. This housing 140 is liable to deform overall due to external force, and deformation and vibration of the flexible substrate 182 is liable to occur. The reinforcement member 186A according to the first exemplary embodiment is accordingly advantageous in such a monocoque.

Figure 8B:
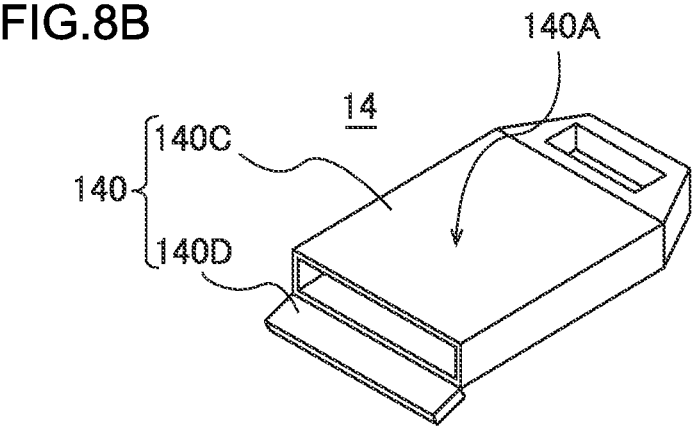
FIG. 8B is a perspective view illustrating a structure of a housing of a radiographic image detector according to the first exemplary embodiment.

The housing 140 illustrated in FIG. 8B is provided with a housing main body 140C and a lid 140D that opens and closes about a hinge on one end thereof. With this type of housing 140, a unit including the radiation detection panel 142 is readily installed internally and external detachment of the housed unit is also easily accomplished. Excellent maintainability is accordingly exhibited.

Figure 8C:
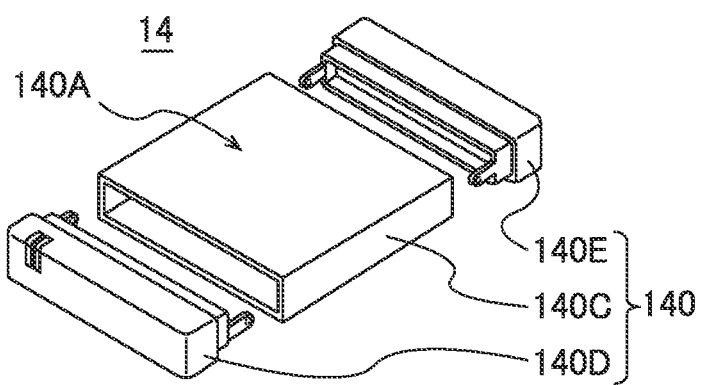
FIG. 8C is a perspective view illustrating a structure of a housing of a radiographic image detector according to the first exemplary embodiment.

The housing 140 illustrated in FIG. 8C is provided with a housing main body 140C and lids 140D and 140E that open and close by being respectively inserted into the two sides of the housing main body 140C. Arm portions projecting out from the lids 140D and 140E respectively engage with the inner wall of the housing main body 140C and are fixed in their inserted positions. This type of housing 140, similarly to the housing 140 illustrated in FIG. 8B, has excellent maintainability.

[Operation and Advantageous Effects of the First Exemplary Embodiment]

As explained above, in the radiographic image capture device 10 according to the first exemplary embodiment, deformation and vibration occurs in the flexible substrate 182 when external force is imparted during handling. On the flexible substrate 182 provided with electronic components (such as the signal processing section 202), the deformation amount and vibration amplitude of the flexible substrate 182 is exacerbated by the weights of the electronic components, and so the stress imparted to the wiring lines 182L3 is also increased. In particular, the deformation amount and vibration amplitude of the flexible substrate 182 is larger in the low wiring density region 184B of the flexible substrate 182 than in the high wiring density region 184A. The reinforcement member 186A is provided at least at the low wiring density region 184B of the flexible substrate 182, and so the mechanical strength of the wiring lines 182L3 is raised by the reinforcement member 186A in the low wiring density region 184B. The deformation amount and vibration amplitude of the flexible substrate 182 is accordingly suppressed in the low wiring density region 184B, thereby enabling damage such as creasing or severing of the wiring lines 182L3 to be effectively suppressed or prevented.

Moreover, in the radiographic image capture device 10 according to the first exemplary embodiment, compared to the mechanical strength of the region where the electronic components (the second electronic components 242A to 242D and the third electronic components 242E, 242F) of the flexible substrate 182 are provided, the mechanical strength of regions between the respective electronic components of the flexible substrate 182 is lower due to the absence of electronic components. By providing the reinforcement member 186A in the low wiring density region 184B that is a region of the flexible substrate 182 between the electronic components, the deformation amount and vibration amplitude of the flexible substrate 182 is suppressed, thereby enabling damage such as creasing or severing of the wiring lines 182L3 to be effectively suppressed or prevented.

Moreover, in the radiographic image capture device 10 according to the first exemplary embodiment, in addition to the low wiring density region 184B of the flexible substrate 182, the reinforcement member 186A is provided so as to be contiguous at least to the regions where the electronic components (the second electronic components 242A to 242D and the third electronic components 242E, 242F) are provided. The mechanical strength in the region of the flexible substrate 182 where the electronic components are provided is raised due to the presence of the electronic components, and the mechanical strength is raised further by the reinforcement member 186A. Due to providing the reinforcement member 186A contiguously to the region where the electronic components are disposed and to the low wiring density region 184B, the mechanical strength of the wiring lines 182L3 is raised even more, particularly in the low wiring density region 184B.

Moreover, in the radiographic image capture device 10 according to the first exemplary embodiment, the high wiring density region 184A is present on the flexible substrate 182 between the signal processing section 202 (first electronic component) of large size (heavy) and the second electronic components 242A to 242D of small size (light). Moreover, the low wiring density region 184B is present between the second electronic components 242A to 242D and the third electronic components 242E, 242F, these being of respectively small size. The reinforcement member 186A is provided at least at the low wiring density region 184B between the second electronic components 242A to 242D and the third electronic components 242E, 242F. Hence the deformation amount and vibration amplitude of the flexible substrate 182 in the low wiring density region 184B is suppressed, thereby enabling damage such as creasing or severing of the wiring lines 182L3 to be effectively suppressed or prevented.

Moreover, in the radiographic image capture device 10 according to the first exemplary embodiment, the tensile elasticity of the reinforcement member 186A is set at 1 Mpa or greater and lower than the tensile elasticity of the flexible substrate 182. The mechanical strength of the wiring lines 182L3 is accordingly raised while still enabling the flexibility of the flexible substrate 182 to be maintained.

Moreover, in the radiographic image capture device 10 according to the first exemplary embodiment, the reinforcement member 186A having a lower tensile elasticity (being softer) than the flexible substrate 182 is provided with a greater thickness than the thickness of the flexible substrate 182. Thus at the reinforcement member 186A, the flexibility (bending properties) of the flexible substrate 182 are maintained while still raising the mechanical strength of the wiring lines 182L3.

Moreover, in the radiographic image capture device 10 according to the first exemplary embodiment, the reinforcement member 186A is configured by at least one material such as a styrene polymer. The tensile elasticity of the reinforcement member 186A is accordingly set lower than the tensile elasticity of the flexible substrate 182, and so the mechanical strength of the wiring lines 182L3 can be raised while maintaining the flexibility of the flexible substrate 182.

In the radiographic image capture device 10 according to the first exemplary embodiment, the mechanical strength of the power supply lines (the wiring lines 182L2) provided to the low wiring density region 184B of the flexible substrate 182 is raised by the reinforcement member 186A. Damage to the power supply lines is effectively suppressed or prevented using the reinforcement member 186A, and so a power supply with noise that has been reduced by the second electronic components 242A to 242D and the third electronic components 242E, 242F is supplied to the first electronic component (the signal processing section 202). Thus, since analogue-to-digital signal processing is performed in the first electronic component on the electrical signals from the radiation detection panel 142, this accordingly enables defects (in particular occurrence of line defects) in radiographic image capture data to be prevented from occurring.

Moreover, in the radiographic image capture device 10 according to the first exemplary embodiment, the mechanical strength of the power supply lines (the wiring lines 182L3) provided to the low wiring density region 184B of the flexible substrate 182 is raised by the reinforcement member 186A. Damage to the power supply lines is effectively suppressed or prevented by the reinforcement member 186A, and so the power supply supplied to the first electronic component (the signal processing section 202) is further smoothed by the second electronic components 242A to 242D and the third electronic components 242E, 242F. Thus, since analogue-to-digital signal processing is performed in the first electronic component on the electrical signals from the radiation detection panel 142, defects in the radiographic image capture data (and in particular occurrence of line defects) can be prevented from occurring.

(Second Exemplary Embodiment)

Explanation follows of a second exemplary embodiment of the present invention as an example of the radiographic image detector 14 of the radiographic image capture device 10 according to the first exemplary embodiment described above in which the plan view profile of the reinforcement member has been modified.

[Radiographic Image Detector Equipment Structure]

As illustrated in FIGS. 9A and 9B, in the radiographic image detector 14 according to the second exemplary embodiment, reinforcement members 186B are provided at the flexible substrates 182. As well as on a low wiring density region 184B, the reinforcement members 186B are also provided at a high wiring density region 184A, on a signal processing section 202 (first electronic component), on second electronic components 242A to 242D and on third electronic components 242E, 242F. The reinforcement members 186B are moreover disposed contiguously over these regions and components.

Specific materials and manufacturing conditions of the reinforcement members 186B are similar to the specific materials and the like given for the reinforcement member 186A of the first exemplary embodiment.

Moreover, the thickness of each of the reinforcement members 186B may be increased such that the reinforcement member 186B makes contact with the inner wall of the housing 140 (in this case the inner wall of the non-irradiation face 140B). The reinforcement members 186B have excellent thermal conductivity and hence heat generated in particular by operation of the signal processing section 202 can be dissipated to the housing 140 through the reinforcement members 186B. The heat dissipation capability is accordingly raised.

[Operation and Advantageous Effects of the Second Exemplary Embodiment]

In the radiographic image capture device 10 according to the second exemplary embodiment similar operation and advantageous effects can be obtained to those of the radiographic image capture device 10 according to the first exemplary embodiment as described above.

Moreover, in the radiographic image capture device 10 according to the second exemplary embodiment, the reinforcement member 186B is provided contiguously to the high wiring density region 184A, and the regions provided with the electronic components (the signal processing section 202, the second electronic components 242A to 242D and the third electronic components 242E, 242F), in addition to over the low wiring density region 184B of the flexible substrate 182. The mechanical strength is raised in the region of the flexible substrate 182 where the electronic components are provided due to the presence of the electronic components, and the mechanical strength is further raised by the reinforcement member 186B. The mechanical strength of the wiring lines 182L3 is accordingly raised even further, particularly in the low wiring density region 184B, due to providing the reinforcement member 186B provided contiguous to the region where these electronic components are provided, to the high wiring density region 184A, and to the low wiring density region 184B.

(Third Exemplary Embodiment)

Explanation follows regarding a third exemplary embodiment of the present invention as an example in which the radiographic image detector 14 of the radiographic image capture device 10 according to the first exemplary embodiment is provided with fixing members 187A in addition to the reinforcement member 186A.

[Equipment Structure of Radiographic Image Detector]

Figure 10A:
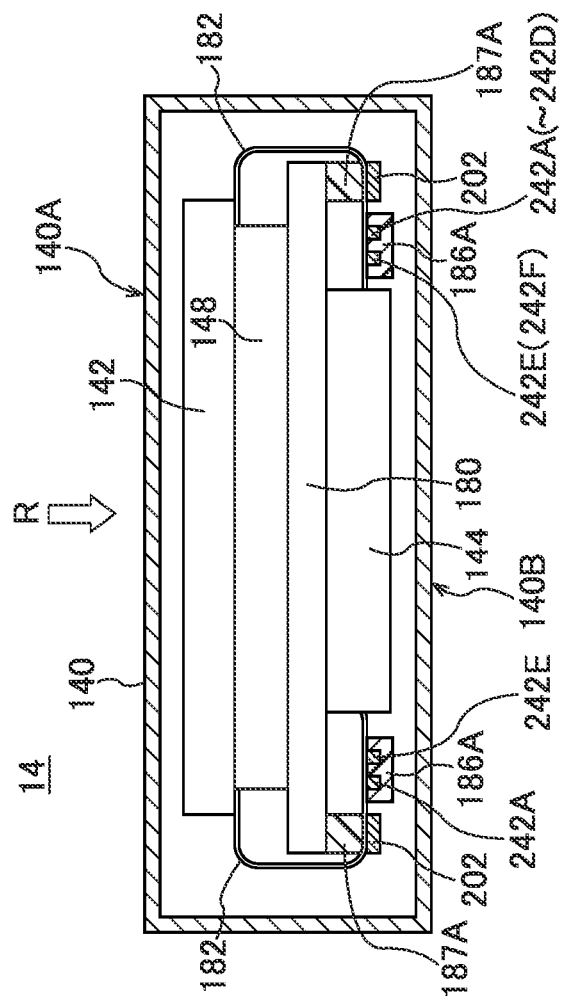
FIG. 10A is a side cross-section illustrating a specific structure of a radiographic image detector of a radiographic image capture device according to a third exemplary embodiment of the present invention.

As illustrated in FIG. 10A and FIG. 10B, in the radiographic image detector 14 according to the third exemplary embodiment, the reinforcement member 186A is provided at least at the low wiring density region 184B of the flexible substrate 182, and the fixing members 187A are also provided at the regions where the signal processing sections 202 (first electronic components) are provided. The fixing members 187A are interposed in this case between the back face of the regions of the flexible substrate 182 where the signal processing sections 202 are mounted and the support member 180, and the low wiring density region 184B of the flexible substrate 182 is fixed (bonded) to the support member 180 by the fixing members 187A.

The fixing members 187A are, for example, configured from at least one material out of for example a silicone gel, a urethane gel, or an acrylic gel. These materials have adhesive properties and also have excellent thermal conductivity. Note that the fixing members 187A may employ a layered material formed from two or more types of the materials described above.

[Operation and Advantageous Effects of the Third Exemplary Embodiment]

Similar operation and advantageous effects can be exhibited by the radiographic image capture device 10 according to the third exemplary embodiment to those of the radiographic image capture device 10 according to the first exemplary embodiment as described above.

Moreover, in the radiographic image capture device 10 according to the third exemplary embodiment, deformation and vibration occur in the flexible substrate 182 when external force is imparted during handling. The deformation amount and vibration amplitude of the flexible substrate 182 is exacerbated by the weight of the electronic components (the signal processing sections 202, the second electronic components 242A to 242D and the third electronic components 242E, 242F), thereby increasing the stress imparted to the wiring lines 182L3. In particular, in the low wiring density region 184B of the flexible substrate 182, the deformation amount and vibration amplitude of the flexible substrate 182 would generally be larger than in the high wiring density region 184A. The fixing members 187A are accordingly provided at least between the regions of the flexible substrate 182 where the signal processing sections 202 (first electronic components) are provided and the support member 180, and these regions are fixed to the support member 180 by the fixing members 187A. The portions of the flexible substrate 182 that cause the deformation amount and vibration amplitude to be exacerbated are accordingly fixed to the support member 180 by the fixing members 187A, such that deformation and vibration is not generated locally in the flexible substrate 182. The deformation amount and vibration amplitude of the flexible substrate 182 is accordingly suppressed in the low wiring density region 184B, thereby enabling damage such as creasing or severing of the wiring lines 182L3 to be effectively suppressed or prevented.

Moreover, in the radiographic image capture device 10 according to the third exemplary embodiment, the heat generated by operation of the electronic components (in particular the signal processing sections 202) mounted to the flexible substrate is dissipated to the support member 180 through the fixing members 187A having heat dissipation capability, and so the heat dissipation capability can be raised.

Moreover, in the radiographic image capture device 10 according to the third exemplary embodiment, the fixing members 187A are configured with at least one material selected from a silicone gel, a urethane gel or an acrylic gel. Since these materials have appropriate elasticity, deformation and vibration of the flexible substrate can be effectively suppressed or prevented. In addition, the heat dissipation capability can be raised due to these materials having heat dissipation capability.

(Fourth Exemplary Embodiment)

Explanation follows of a fourth exemplary embodiment of the present invention as an example in which the radiographic image detector 14 of the radiographic image capture device 10 according to the third exemplary embodiment has reinforcement members 186A of modified shape.

[Equipment Structure of Radiographic Image Detector]

Figure 11B:
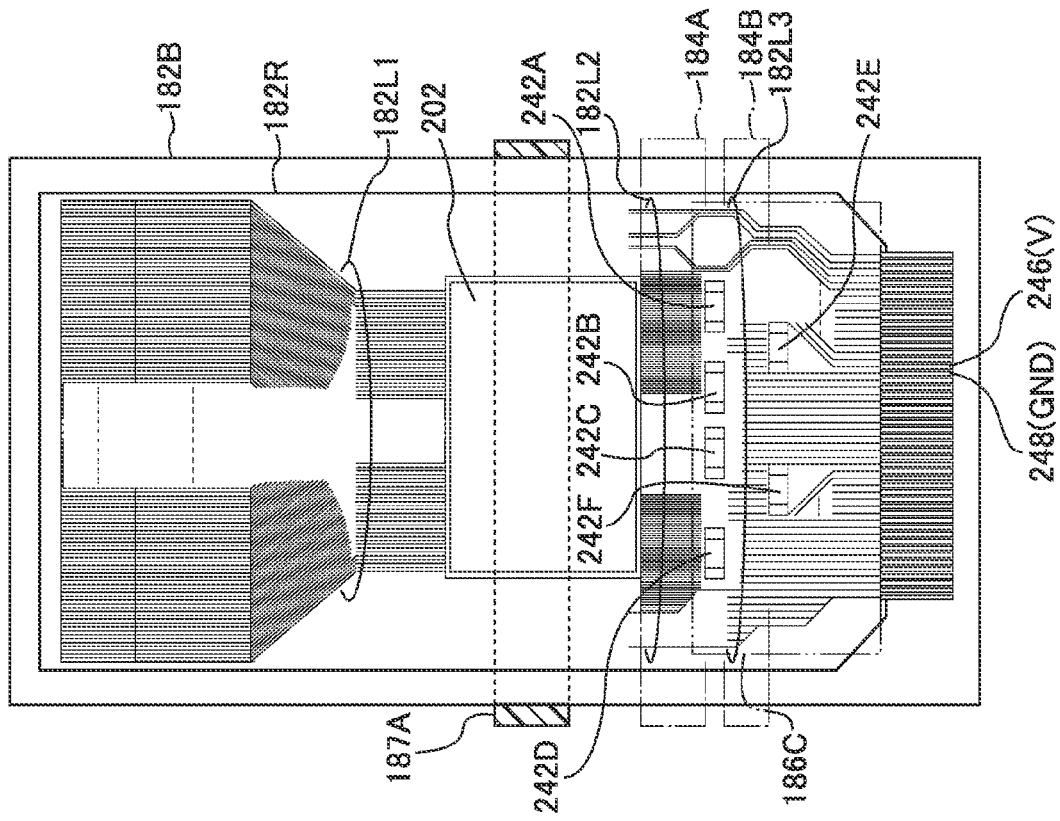
FIG. 11B is a plan view of a flexible substrate illustrated in FIG. 11A.

As illustrated in FIG. 11A and FIG. 11B, in the radiographic image detector 14 according to the fourth exemplary embodiment, reinforcement members 186C are provided at the flexible substrate 182. Each of these reinforcement members 186C, in addition to on a low wiring density region 184B, is also provided at a region reaching to external terminals on the other end side of the flexible substrate 182 (on the signal processing board 144 side). The reinforcement members 186C are moreover disposed contiguous on these regions.

Specific materials and manufacturing conditions of the reinforcement member 186C are similar to the specific materials and the like given for the reinforcement member 186A of the first exemplary embodiment.

[Operation and Advantageous Effects of the Fourth Exemplary Embodiment]

In the radiographic image capture device 10 according to the fourth exemplary embodiment, similar operation and advantageous effects can be obtained to those of the radiographic image capture device 10 according to the third exemplary embodiment described above.

In the radiographic image capture device 10 according to the fourth exemplary embodiment, the reinforcement members 186C are each provided at a region reaching from a low wiring density region 184B to external terminals at the other end side of flexible substrate 182. The region from the low wiring density region 184B to external terminals at the other end side of the flexible substrate 182 also belongs to a low wiring density region. Therefore, due to the raised mechanical strength of the flexible substrate 182, including in the low wiring density region, damage to the wiring lines 182L3 can be effectively suppressed or prevented.

(Fifth Exemplary Embodiment)

Explanation follows of a fifth exemplary embodiment of the present invention as an example in which there is varying thickness of the reinforcement member 186B in the radiographic image detector 14 of the radiographic image capture device 10 according to the second exemplary embodiment described above.

[Equipment Structure of Radiographic Image Detector]

As illustrated in FIG. 12A and FIG. 12B, in the radiographic image detector 14 according to the fifth exemplary embodiment, reinforcement members 186D are provided at the flexible substrates 182. Each of the reinforcement members 186D is provided at a low wiring density region 184B and at a high wiring density region 184A, and has a different thickness at the low wiring density region 184B and at the high wiring density region 184A. Specifically, the thickness of the reinforcement member 186D becomes thinner from the low wiring density region 184B towards the high wiring density region 184A, either with a linear profile or non-linear profile. A linear profile is used here to mean that the thickness of the reinforcement member 186D thins in a straight line. A non-linear profile is used here to mean that the thickness of the reinforcement member 186D thins in a curve. In other words the thickness of the reinforcement member 186D gets thinner gradually.

The reinforcement member 186D is formed by, for example, coating a material such as a styrene polymer employing a coating apparatus. The coating amount is adjustable. The thickness of the reinforcement member 186D is accordingly adjusted to use a large coating amount in the low wiring density region 184B of the flexible substrates 182 and to gradually reduce the coating amount on progression towards the high wiring density region 184A. Note that the thickness of the reinforcement member 186D may be made to change stepwise, in two or more steps.

Specific materials and manufacturing conditions of the reinforcement member 186D are similar to the specific materials and the like given for the reinforcement member 186A of the first exemplary embodiment.

[Operation and Advantageous Effects of the Fifth Exemplary Embodiment]

The radiographic image capture device 10 according to the fifth exemplary embodiment is able to obtain similar operation and advantageous effects to those of the radiographic image capture device 10 according to the second exemplary embodiment, as described previously.

Moreover, in the radiographic image capture device 10 according to the fifth exemplary embodiment, the mechanical strength is raised for the wiring lines 182L3 in the low wiring density region 184B of the flexible substrates 182, and the mechanical strength of the wiring lines 182L3 gradually decreases from the low wiring density region 184B of the flexible substrates 182 towards the high wiring density region 184A. Namely, due to being able to uniformly distribute stress imparted to the flexible substrates 182 from external force, generation of uneven stress is suppressed, thereby enabling damage to the wiring lines 182L3 to be effectively suppressed or prevented. Moreover, the thickness of the reinforcement member 186D gets thinner on progression from the low wiring density region 184B of the flexible substrates 182 towards the high wiring density region 184A, enabling the amount of the reinforcement member 186D used to be reduced.

(Sixth Exemplary Embodiment)

Explanation follows of a sixth exemplary embodiment of the present invention as an example in which deformation and vibration of flexible substrates 182 is effectively suppressed or prevented by fixing members in the radiographic image detector 14 of the radiographic image capture device 10 according to the third exemplary embodiment or the fourth exemplary embodiment as described above.

[Equipment Structure of Radiographic Image Detector]

As illustrated in FIG. 13A and FIG. 13B, in a radiographic image detector 14 according to the sixth exemplary embodiment, fixing members 187B are provided at the flexible substrates 182. The reinforcement members 186A according to the first exemplary embodiment are not provided to the flexible substrates 182. Each of the fixing members 187B is provided to the flexible substrate 182 at least between a low wiring density region 184B and a support member 180, fixing (bonding) the low wiring density region 184B of the flexible substrate 182 to the support member 180. The fixing member 187B is provided between the respective second electronic components 242A to 242D and third electronic components 242E, 242F of the flexible substrate 182, and the support member 180.

Specific materials and manufacturing conditions of the fixing member 187B are similar to the specific materials and the like given for the fixing members 187A of the third exemplary embodiment.

[Operation and Advantageous Effects of the Sixth Exemplary Embodiment]

The radiographic image capture device 10 according to the sixth exemplary embodiment is able to obtain similar operation and advantageous effects to those of the radiographic image capture device 10 according to the third exemplary embodiment or the fourth exemplary embodiment as described above.

Moreover, in the radiographic image capture device 10 according to the sixth exemplary embodiment, deformation and vibration occurs in the flexible substrate 182 when external force is imparted during handling. The deformation amount and vibration amplitude of the flexible substrate 182 is exacerbated by the weights of the electronic components (the signal processing section 202 and the second electronic components 242A to 242D and the third electronic components 242E, 242F), thereby increasing the stress imparted to the wiring lines 182L3. In particular, in the low wiring density region 184B of the flexible substrate 182, the deformation amount and vibration amplitude of the flexible substrate 182 would generally be larger than for the high wiring density region 184A. The fixing member 187B is accordingly provided between the support member 180 and at least the low wiring density region 184B of the flexible substrate 182. The low wiring density region 184B of the flexible substrate 182 is thereby fixed to the support member 180 by the fixing member 187B. Damage such as creasing or severing of the wiring lines 182L3 can accordingly be effectively suppressed or prevented by the portion of the flexible substrate 182 that causes an increase in the deformation amount and vibration amplitude being fixed by the fixing member 187B to the support member 180.

Moreover, in the radiographic image capture device 10 according to the sixth exemplary embodiment, the high wiring density region 184A is present on the flexible substrates 182 between the large size signal processing section 202 (first electronic component) and the small size second electronic components 242A to 242D. There is also the low wiring density region 184B present between the respectively small sized second electronic components 242A to 242D and the third electronic components 242E, 242F. The fixing member 187B is accordingly provided at least at the low wiring density region 184B between the second electronic components 242A to 242D and the third electronic components 242E, 242F. The deformation amount and vibration amplitude is accordingly suppressed in the low wiring density region 184B of the flexible substrates 182, thereby enabling damage such as creasing or severing of the wiring lines 182L3 to be effectively suppressed or prevented.

Moreover, in the radiographic image capture device 10 according to the sixth exemplary embodiment, each of the flexible substrates 182 is fixed to the support member 180 by the fixing member 187B. The support member 180 (including the radiation detection panel 142 and the signal processing board 144) and the flexible substrate 182 are housed in the housing 140 after fixing. Thus the ease of assembly characteristics of the radiographic image capture device 10 can be raised compared to case in which the housing 140 and the flexible substrate 182 are fixed after flexible substrate 182 has been housed in the housing 140.

In the radiographic image capture device 10 according to the sixth exemplary embodiment, the region of the flexible substrate 182 where the electronic components (the second electronic components 242A to 242D and the third electronic components 242E, 242F) are provided is fixed to the support member 180 through the fixing member 187B. The heat generated by operation of the electronic components is accordingly discharged to the support member 180 through the fixing member 187B that has heat dissipation capability, enabling the heat dissipation capability to be raised.

(Seventh Exemplary Embodiment)

Explanation follows of a seventh exemplary embodiment of the present invention as a modified example of the fixing member 187B in the radiographic image detector 14 of the radiographic image capture device 10 according to the sixth exemplary embodiment.

[Equipment Structure of Radiographic Image Detector]

Figure 14:
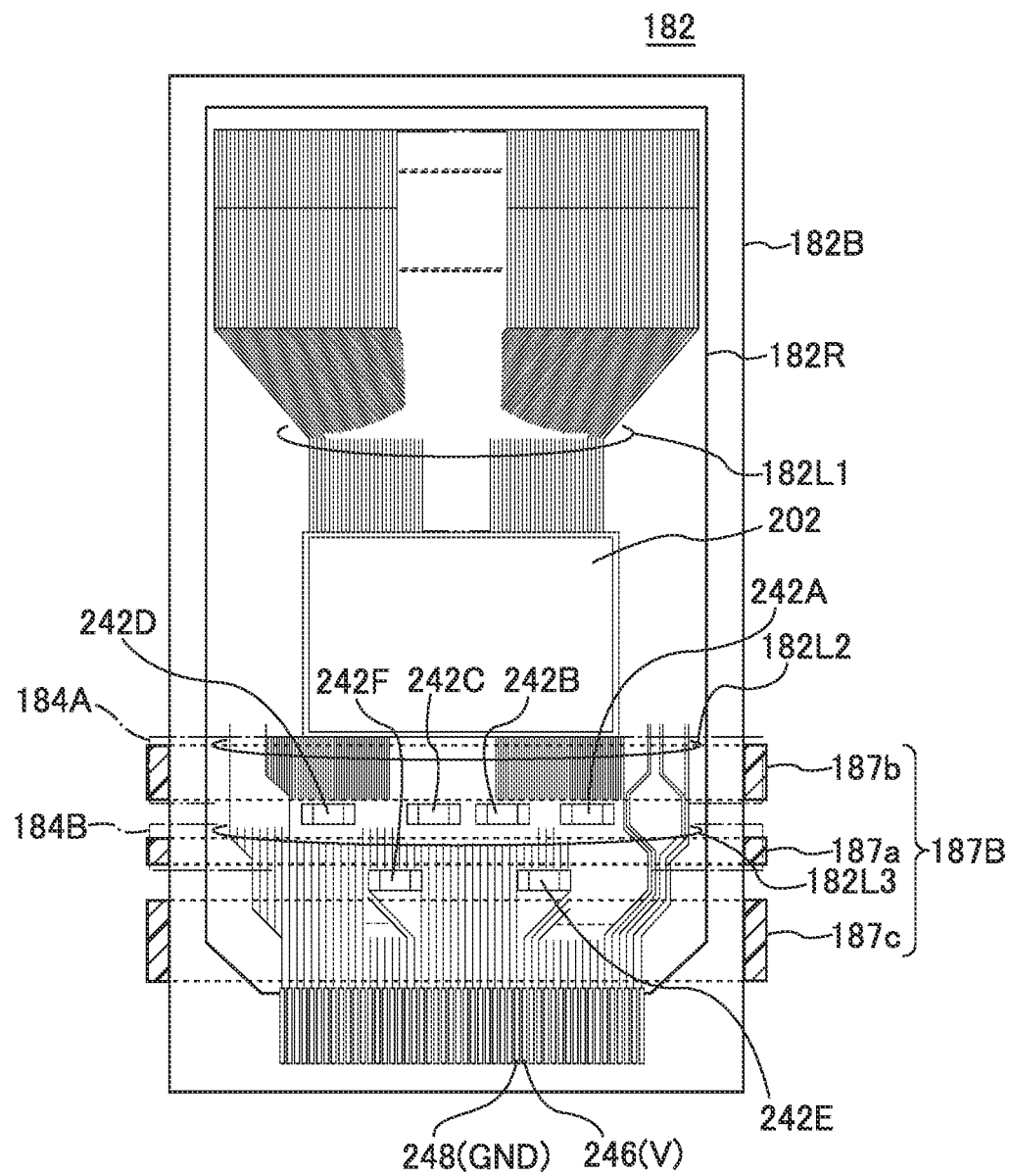
FIG. 14 is a plan view of a flexible substrate of a radiographic image detector of a radiographic image capture device according to a seventh exemplary embodiment of the present invention.

As illustrated in FIG. 14, a radiographic image detector 14 of the seventh exemplary embodiment is provided with a fixing member 187B on a flexible substrate 182. The fixing member 187B is equipped with a first fixing member 187a, a second fixing member 187b, and a third fixing member 187c. The first fixing member 187a is provided at a low wiring density region 184B of the flexible substrate 182. The second fixing member 187*b* is provided at a high wiring density region 184A of the flexible substrate 182. The third fixing member 187*c* is provided at a low wiring density region between the low wiring density region 184B of the flexible substrate 182 and the external terminals at the other end side. The first fixing member 187*a*, the second fixing member 187*b* and the third fixing member 187*c* all fix the flexible substrate 182 to the support member 180. In this case the fixing member 187B is not provided at any of the regions of the flexible substrate 182 where the signal processing section 202, the second electronic components 242A to 242D and the third electronic components 242E, 242F are present.

Specific materials and manufacturing conditions of the fixing member 187B are similar to the specific materials and the like given for the fixing members 187A of the third exemplary embodiment.

[Operation and Advantageous Effects of the Seventh Exemplary Embodiment]

The radiographic image capture device 10 according to the seventh exemplary embodiment is capable of obtaining similar operation and advantageous effects to those of the radiographic image capture device 10 according to the sixth exemplary embodiment as described above.

Moreover, in the radiographic image capture device 10 according to the seventh exemplary embodiment, the fixing member 187B is provided over a wide range of the flexible substrate 182 that includes the low wiring density region 184B and the high wiring density region 184A. The portions of the flexible substrate 182 that cause an increased deformation amount and vibration amplitude are fixed to the support member 180 by the fixing member 187B, thereby enabling damage to the wiring lines 182L3 to be effectively suppressed or prevented.

(Eighth Exemplary Embodiment)

Explanation follows of an eighth exemplary embodiment of the present invention as an example in which the shape has been changed of the fixing member 187A of the radiographic image detector 14 of the radiographic image capture device 10 according to the sixth exemplary embodiment as described above.

[Equipment Structure of Radiographic Image Detector]

Figure 15B:
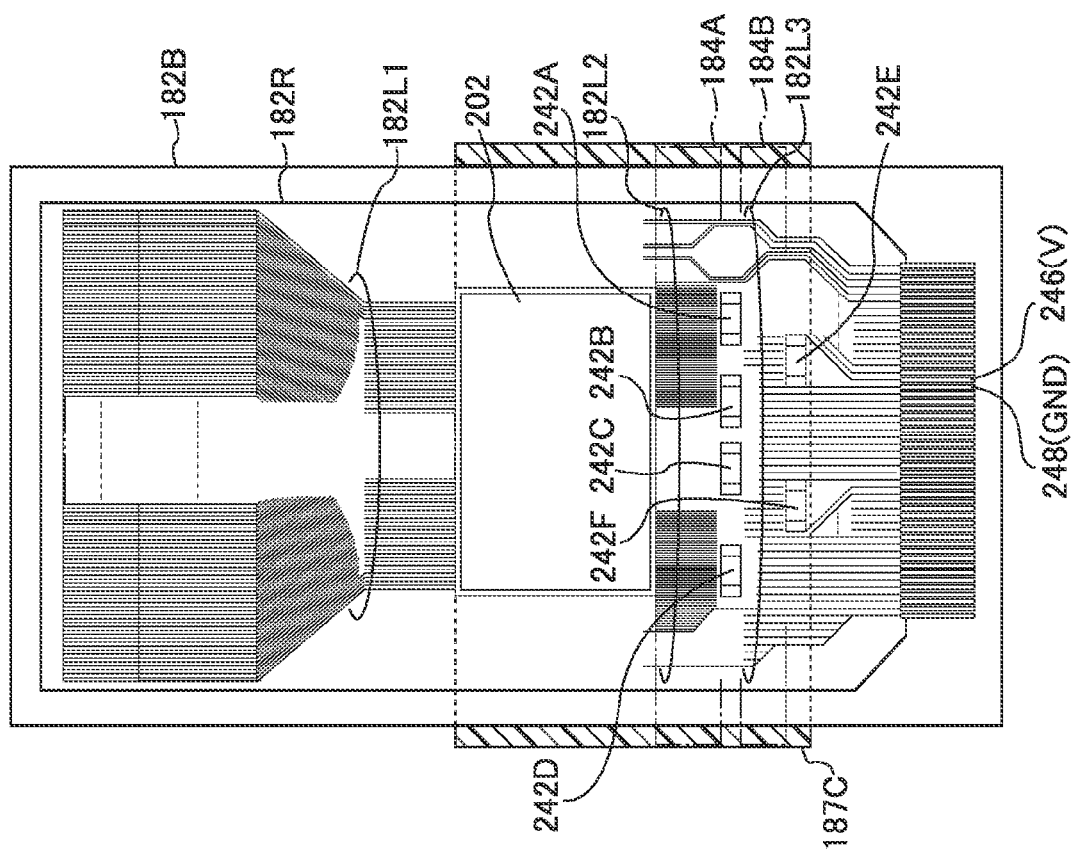
FIG. 15B is a plan view of a flexible substrate illustrated in FIG. 15A.

As illustrated in FIG. 15A and FIG. 15B, in a radiographic image detector 14 according to an eighth exemplary embodiment, fixing members 187C are provided at flexible substrates 182. Each of the fixing members 187C is provided at a low wiring density region 184B and a high wiring density region 184A of the flexible substrate 182, and in regions where a signal processing section 202, second electronic components 242A to 242D, and third electronic components 242E, 242F are mounted.

Specific materials and manufacturing conditions of the fixing members 187C are similar to the specific materials and the like given for the fixing members 187A of the third exemplary embodiment.

[Operation and Advantageous Effects of the Eighth Exemplary Embodiment]

The radiographic image capture device 10 of the eighth exemplary embodiment is capable of obtaining similar operation and advantageous effects to those of the radiographic image capture device 10 according to the sixth exemplary embodiment.

Moreover, in the radiographic image capture device 10 according to the eighth exemplary embodiment the fixing members 187C are provided over a wide range of the flexible substrates 182, including the low wiring density region 184B, the high wiring density region 184A, and the regions where the electronic components are provided. The portions of the flexible substrates 182 that cause an increased deformation amount and vibration amplitude are accordingly fixed to the support member 180 by the fixing member 187C, thereby enabling damage to the wiring lines 182L2 to be effectively suppressed or prevented.

(Ninth Exemplary Embodiment)

Explanation follows of a ninth exemplary embodiment of the present invention as modified examples of a fixing member in the radiographic image detector 14 of the radiographic image capture device 10 according to the eighth exemplary embodiment.

[Equipment Structure of Radiographic Image Detector in a First Modified Example]

Figure 16:
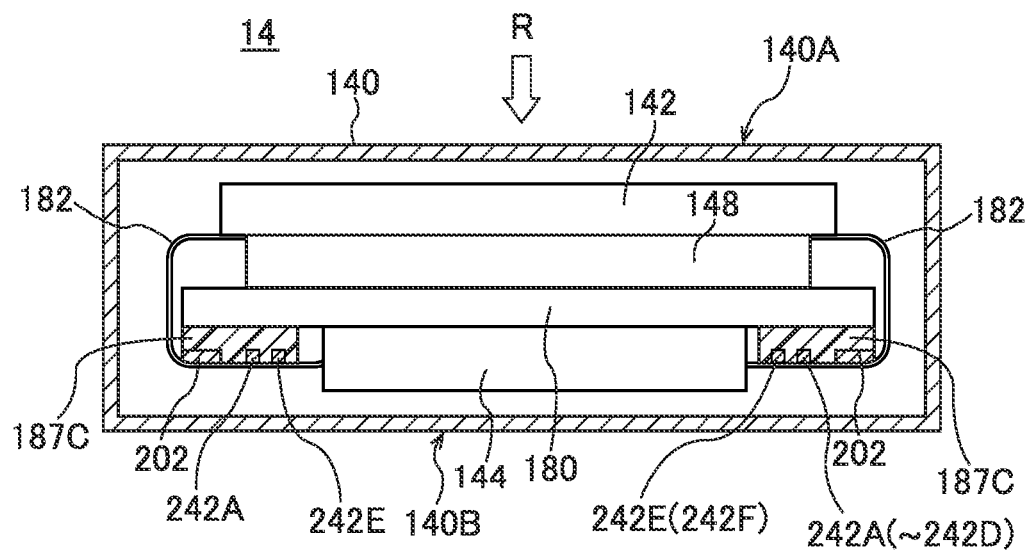
FIG. 16 is a side cross-section illustrating a specific structure of a radiographic image detector of a radiographic image capture device according to a first modified example of a ninth exemplary embodiment of the present invention.

As illustrated in FIG. 16, in a radiographic image detector 14 according to a first modified example of a ninth exemplary embodiment, signal processing sections 202, second electronic components 242A to 242D and third electronic components 242E, 242F are mounted on surfaces of the flexible substrates 182 facing towards the support member 180. Fixing members 187C are provided between the flexible substrates 182 and the support member 180 so as to cover the electronic components such as the signal processing sections 202.

In the radiographic image capture device 10 according to the first modified example, heat generated by operation of the signal processing sections 202 that have particularly large amount of generated heat is discharged directly to the support member 180 through the fixing members 187C. The heat dissipation capability is accordingly improved.

[Equipment Structure of Radiographic Image Detector in Second Modified Example]

Figure 17:
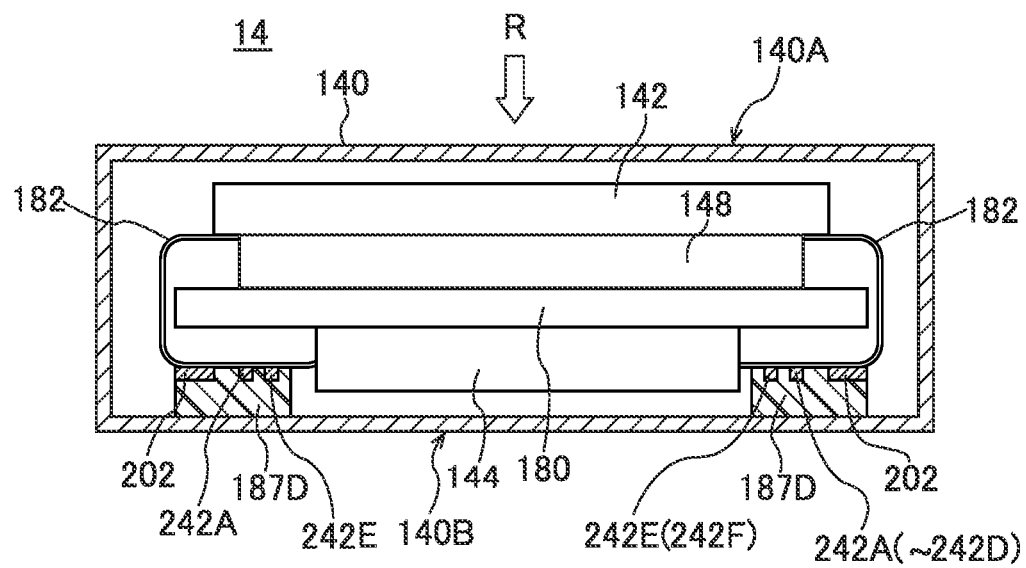
FIG. 17 is a side cross-section illustrating a specific structure of a radiographic image detector of a radiographic image capture device according to a second modified example of the ninth exemplary embodiment of the present invention.

As illustrated in FIG. 17, in the radiographic image detector 14 according to the second modified example of the ninth exemplary embodiment, signal processing sections 202, second electronic components 242A to 242D and third electronic components 242E, 242F are mounted on a surface of the flexible substrate 182 so as to face towards the inner wall of a non-irradiation face 140B of the housing 140. Fixing members 187D are provided between the flexible substrates 182 and the inside wall of the non-irradiation face 140B of the housing 140 so as to cover the electronic components such as the signal processing sections 202. The fixing members 187D make contact with the inner wall.

In the radiographic image capture device 10 according to the second modified example, heat generated by operation of the signal processing sections 202 that have a particularly large amount of generated heat is discharged directly to the housing 140 through the fixing members 187D. The heat dissipation capability is accordingly improved.

[Equipment Structure of Radiographic Image Detector of Third Modified Example]

Figure 18:
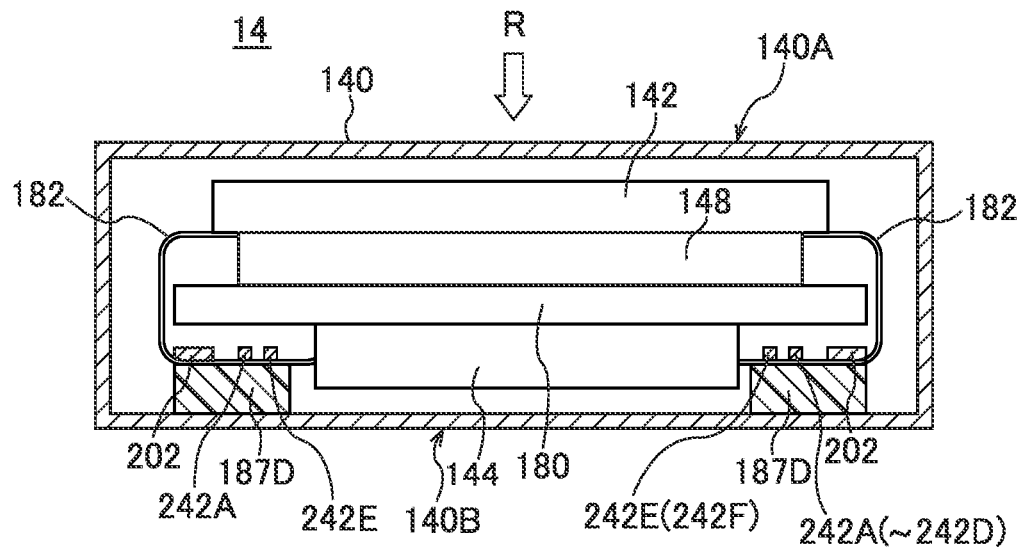
FIG. 18 is a side cross-section illustrating a specific structure of a radiographic image detector of a radiographic image capture device according to a third modified example of the ninth exemplary embodiment of the present invention.

As illustrated in FIG. 18, in the radiographic image detector 14 according to a third modified example of the ninth exemplary embodiment, signal processing sections 202, second electronic components 242A to 242D and third electronic components 242E, 242F are mounted on surfaces of the flexible substrate 182 facing towards the support member 180. The fixing members 187D are provided at the opposite surface of the flexible substrates 182 to the surface on which the electronic components such as the signal processing sections 202 are provided, between the flexible substrates 182 and the inner wall of the non-irradiation face 140B of the housing 140. The fixing members 187D are in contact with the inner wall.

In the radiographic image capture device 10 according to the third modified example, heat generated by operation of the signal processing section 202 that has a particularly large amount of generated heat is discharged directly to the housing 140 through the fixing members 187D. The heat dissipation capability is accordingly improved.

[Equipment Structure of Radiographic Image Detector of Fourth Modified Example]

Figure 19:
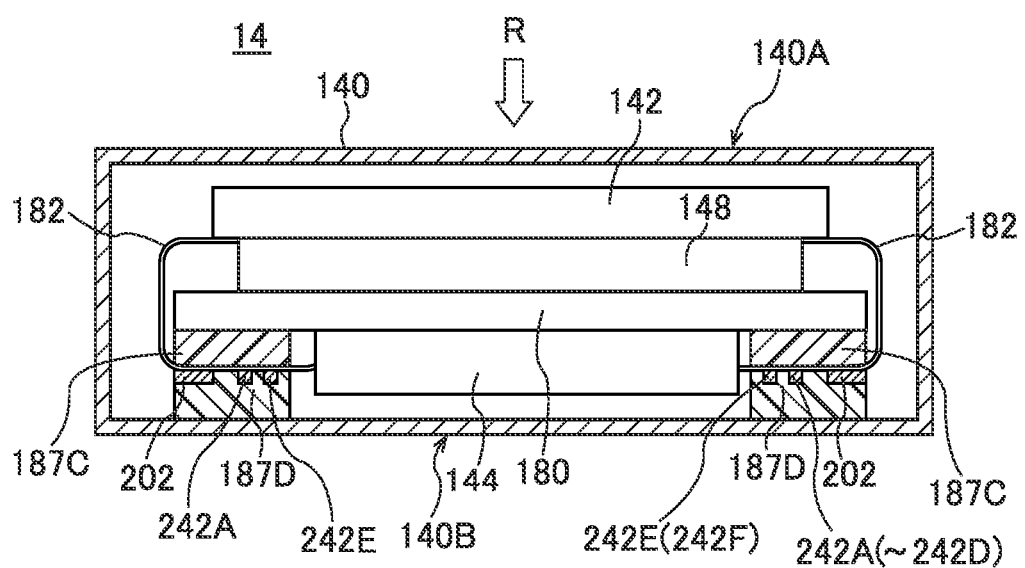
FIG. 19 is a side cross-section illustrating a specific structure of a radiographic image detector of a radiographic image capture device according to a fourth modified example of the ninth exemplary embodiment of the present invention.

As illustrated in FIG. 19, in the radiographic image detector 14 according to a fourth modified example of the ninth exemplary embodiment, signal processing sections 202, second electronic components 242A to 242D and third electronic components 242E, 242F are mounted on surfaces of the flexible substrate 182 facing towards the inner wall of the non-irradiation face 140B of the housing 140. The fixing members 187D are provided between the flexible substrate 182 and the inner wall of the non-irradiation face 140B of the housing 140 so as to cover the electronic components such as the signal processing sections 202. The fixing members 187D are in contact with the inner wall. Moreover, the fixing members 187C are provided between the flexible substrates 182 and the support member 180.

In the radiographic image capture device 10 according to the fourth modified example, heat generated by operation of the signal processing sections 202 that have a particularly large amount of generated heat is discharged directly to the housing 140 through the fixing members 187D, and is discharged to the support member 180 through the fixing members 187C. The heat dissipation capability is accordingly further improved.

[Equipment Structure of Radiographic Image Detector of Fifth Modified Example]

Figure 20:
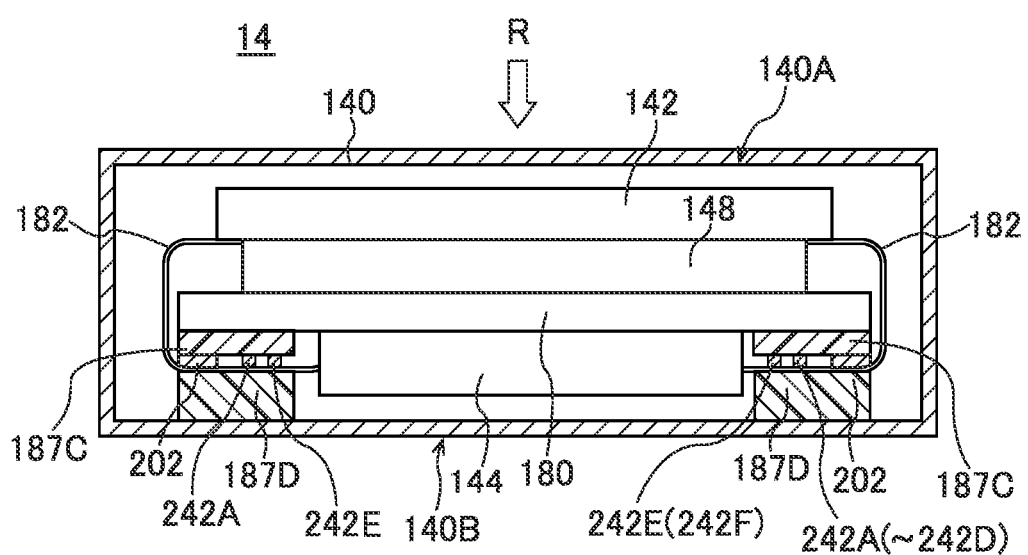
FIG. 20 is a side cross-section illustrating a specific structure of a radiographic image detector of a radiographic image capture device according to a fifth modified example of the ninth exemplary embodiment of the present invention.

As illustrated in FIG. 20, in a radiographic image detector 14 according to a fifth modified example of the ninth exemplary embodiment, signal processing sections 202, second electronic components 242A to 242D and third electronic components 242E, 242F are mounted on surfaces of the flexible substrates 182 facing towards the support member 180. Fixing members 187C are provided between the flexible substrates 182 and the support member 180 so as to cover the electronic components such as the signal processing sections 202. The fixing members 187D are also provided between the flexible substrate 182 and the inner wall of the non-irradiation face 140B of the housing 140.

In a radiographic image capture device 10 according to the fifth modified example, heat generated by operation of the signal processing sections 202 that have a particularly large amount of generated heat is discharged to the support member 180 through the fixing members 187C, and also is discharged directly to the housing 140 through the fixing members 187D. The heat dissipation capability is accordingly even further improved.

(Other Exemplary Embodiments)

Although explanation has been given of plural exemplary embodiments of the present invention and plural modified examples, the present invention is not limited to the above exemplary embodiments and various modifications are possible within a range not departing from the spirit of the present invention.

For example, the present invention may be applied to a flexible substrate mounted with a gate line driver section. Specifically, at least a reinforcement member, or a fixing member, or both a reinforcement member and a fixing member are provided to the flexible substrate such as to regions where wiring is at a low wiring density.

What is claimed is:
1. A radiographic image capture device comprising:
    a radiation detection panel comprising a photoelectric conversion element that converts radiation into an electrical signal;
    a signal processing board that is disposed facing towards the radiation detection panel and that performs signal processing on electrical signals obtained by the radiation detection panel;
    a flexible substrate that comprises wiring lines disposed on a base film provided between the radiation detection panel and the signal processing board and a first electronic component, and a second electronic component and a third electronic component that are smaller in size than the first electronic component, are electrically connected to the wiring lines; and
    a reinforcement member that is provided at a first region between the second electronic component and the third electronic component and that raises the mechanical strength of the wiring lines,
    wherein the first electronic component, the second electronic component and the third electronic component are arrayed in this sequence along an extension direction of the wiring lines, and
    a density of the wiring lines at the first region is lower than a density of the wiring lines at a second region between the first electronic component and the second electronic component.
2. The radiographic image capture device of claim 1, wherein:
    a plurality of the second electronic components and the third electronic components are provided at the flexible substrate; and
    the reinforcement member is provided in at least the first region.
3. The radiographic image capture device of claim 2, wherein:
    the reinforcement member is provided contiguously from the first region at least as far as a region where the second electronic components and the third electronic components are provided.
4. The radiographic image capture device of claim 1, wherein a tensile elasticity of the reinforcement member is set to be 1Mpa or greater and to be lower than a tensile elasticity of the flexible substrate.
5. The radiographic image capture device of claim 4, wherein a thickness of the reinforcement member is set to be thicker than the thickness of the flexible substrate.
6. The radiographic image capture device of claim 1, wherein a thickness of the reinforcement member thins linearly or non-linearly from the first region towards the second region of the flexible substrate.
7. The radiographic image capture device of claim 1, wherein:
    the flexible substrate is configured by a stacked layer of the base film formed from a polyimide resin film and the wiring lines formed from copper; and
    the reinforcement member is configured from at least one material selected from the group consisting of a styrene polymer, an acrylic resin, an epoxy resin, a urethane resin and a silicone resin.
8. The radiographic image capture device of claim 1, wherein:
    the first electronic component has a function to perform analogue-to-digital signal processing on the electrical signals from the radiation detection panel to convert analogue signals into digital signals;

the second electronic component and the third electronic component both have a function to reduce noise in power supplied to the first electronic component; and power supply lines that connect between the first electronic component and the third electronic component are disposed at the first region between the second electronic component and the third electronic component.

9. The radiographic image capture device of claim 8, wherein:

the first electronic component comprises a plurality of sample-and-hold circuits that are connected to each output signal line of the radiation detection panel, a multiplexer with an input that is connected to outputs of the plurality of sample-and-hold circuits, and an analogue-to-digital converter with an input connected to an output of the multiplexer and an output connected to the signal processing board; and the second electronic component and the third electronic component are both condensers electrically connected in parallel across the power supply that supplies the first electronic component.

10. The radiographic image capture device of claim 1, further comprising a housing that internally houses the radiation detection panel, the signal processing board and the flexible substrate; wherein the reinforcement member makes contact with an inner wall of the housing.

11. The radiographic image capture device of claim 1, further comprising:

a support member that is provided between the radiation detection panel and the signal processing board to support the radiation detection panel and the signal processing board; and a fixing member that is disposed between a region of the flexible substrate where at least one of the first electronic component, the second electronic component or the third electronic component is provided and the support member, and that fixes the region of the flexible substrate where the at least one of the first electronic component, the second electronic component or the third electronic component is provided to the support member.

12. The radiographic image capture device of claim 11, wherein the fixing member is configured from at least one material with heat dissipation capability selected from the group consisting of a silicone gel, a urethane gel, and an acrylic gel.

* * * * *